United States Patent [19]
Burklund et al.

[11] Patent Number: 5,354,455
[45] Date of Patent: Oct. 11, 1994

[54] DOUBLE-DENSITY COMMERCIAL FILTERING SYSTEM

[75] Inventors: Sidney A. Burklund, Bothell; Terry D. Olson, Auburn, both of Wash.

[73] Assignee: Filtercorp Partners L.P., Woodinville, Wash.

[21] Appl. No.: 930,233

[22] Filed: Aug. 13, 1992

Related U.S. Application Data

[63] Continuation-in-part of Ser. No. 827,944, Jan. 29, 1992, which is a continuation-in-part of Ser. No. 695,580, May 3, 1991, Pat. No. 5,143,604, which is a continuation-in-part of Ser. No. 527,566, May 22, 1990, Pat. No. 5,075,000.

[51] Int. Cl.$^5$ .................. B01D 24/46; B01D 24/48
[52] U.S. Cl. .................. 210/104; 210/108; 210/168; 210/416.5; 210/445
[58] Field of Search .............. 210/106, 108, 134, 135, 210/136, 137, 167, 416.1, 168, 445, 416.5, 484, 104, 103

[56] References Cited

U.S. PATENT DOCUMENTS

| | | | |
|---|---|---|---|
| 3,279,605 | 10/1966 | Shepherd | 210/110 |
| 3,356,218 | 12/1967 | Grudoski | 210/167 |
| 3,849,312 | 11/1974 | Wecker, Sr. | 210/237 |
| 3,880,757 | 4/1975 | Thomason | 210/167 |
| 3,968,741 | 7/1976 | Hunt | 99/330 |
| 4,043,916 | 8/1977 | Wecker, Sr. | 210/238 |
| 4,112,129 | 9/1978 | Duensing et al. | 426/417 |
| 4,113,623 | 9/1978 | Koether | 210/167 |
| 4,250,039 | 2/1981 | Cozzi et al. | 210/416.5 |
| 4,282,094 | 8/1981 | Mitchell | 210/167 |
| 4,402,827 | 9/1983 | Joseph | 210/314 |
| 4,444,095 | 4/1984 | Anetsberger et al. | 99/408 |
| 4,517,082 | 5/1985 | Prudhomme | 210/117 |
| 4,591,434 | 5/1986 | Prudhomme | 210/117 |
| 4,604,200 | 8/1986 | Machart, Jr. | 210/314 |
| 4,618,419 | 10/1986 | Hollinshead et al. | 210/167 |
| 4,657,673 | 4/1987 | Kessler | 210/108 |
| 4,668,390 | 5/1987 | Hurley et al. | 210/167 |
| 4,702,827 | 10/1987 | Wenzel | 210/117 |
| 4,764,384 | 8/1988 | Gyann | 426/417 |
| 4,768,426 | 9/1988 | Nett | 99/408 |
| 4,804,466 | 2/1989 | Cooper et al. | 210/168 |
| 4,826,590 | 5/1989 | Turman | 210/98 |
| 4,828,694 | 5/1989 | Leason | 210/168 |
| 4,959,144 | 9/1990 | Bernard et al. | 210/232 |
| 4,988,440 | 1/1991 | Bernard et al. | 210/504 |
| 5,062,968 | 11/1991 | Warning | 210/771 |
| 5,075,000 | 12/1991 | Bernard et al. | 210/168 |
| 5,149,449 | 9/1992 | Strid et al. | 210/798 |

FOREIGN PATENT DOCUMENTS

| | | |
|---|---|---|
| 0241617 | 10/1987 | European Pat. Off. . |
| 2482867 | 5/1981 | France . |

OTHER PUBLICATIONS

Article entitled *Evaluation of Frying Oil Filtration Systems,* Journal of Food Science, vol. 57, No. 3, ©1992 Institute of Food Technologists, pp. 651–654, mailed Jun. 4, 1992.

*Primary Examiner*—Robert A. Dawson
*Assistant Examiner*—W. L. Walker
*Attorney, Agent, or Firm*—Christensen, O'Connor, Johnson & Kindness

[57] ABSTRACT

Filtering systems used to filter contaminated fluid. The filtering system (10) includes a supply pump (12); a filter tank (14) having a plurality of removable filter cassettes (16) disposed therein, each filter cassette housing in proper orientation a filter pad (164); a suction pump (18); a level control mechanism (148) maintaining a substantially uniform level of contaminated fluid within the filter tank; and a control panel (20) housing other process control components. Operation of the filtering system includes a backflush cycle and a relaxation cycle to extend the loading life of the filter pads. Also included is a preventive measure designed to eliminate fluid shear that may result as the filter pads approach the end of their loading life. The double-density filtering system (300) employs double-density filter cassettes(304), each cassette housing a pair of filter pads (164). This allows the volume of the filter tank (302) to be reduced, thereby reducing turnover. An enlarged chamber (392) within the double-density filter cassettes reduces fluid turbidity, thereby increasing both flow performance and filter pad loading life.

8 Claims, 19 Drawing Sheets

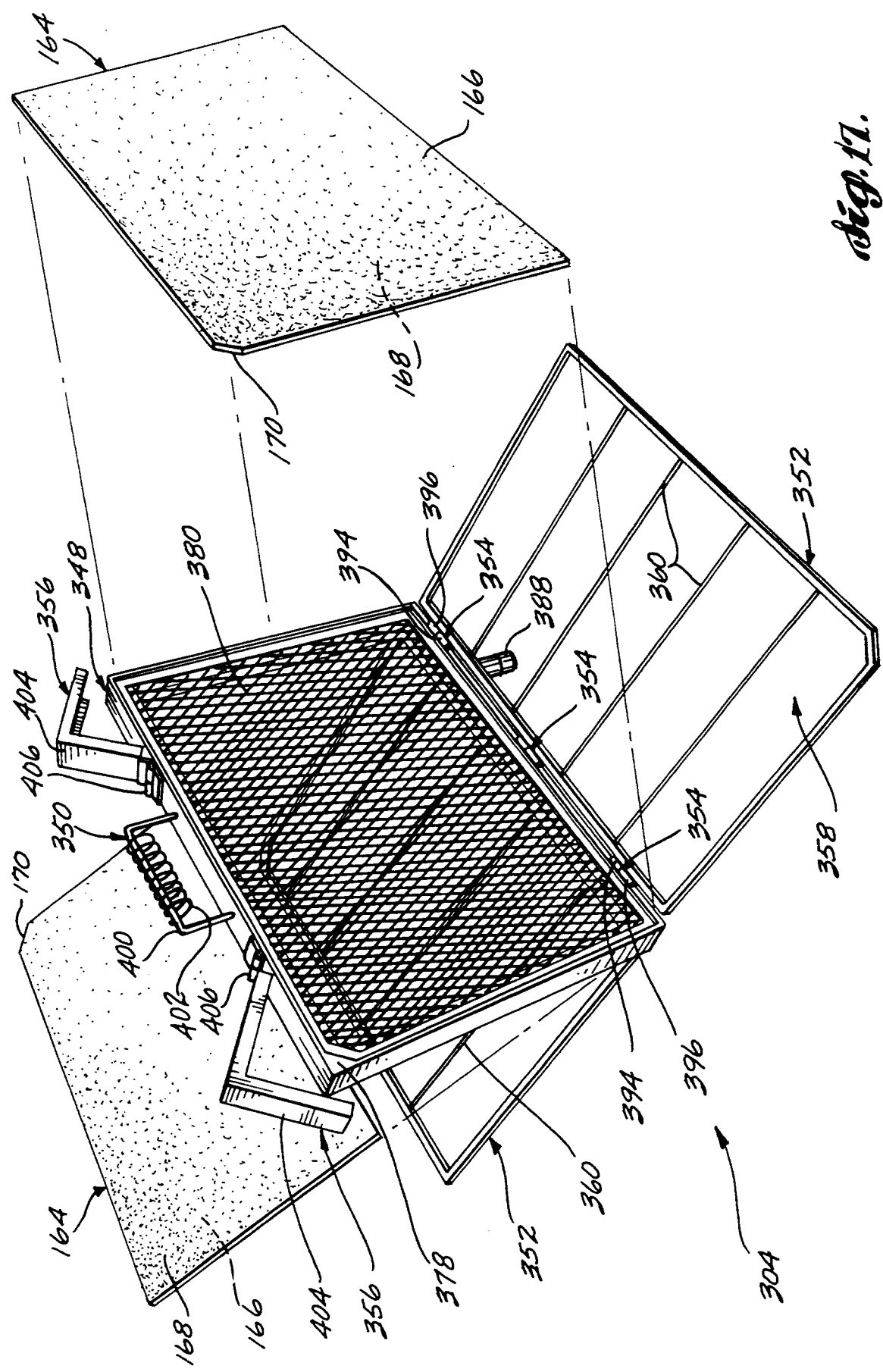

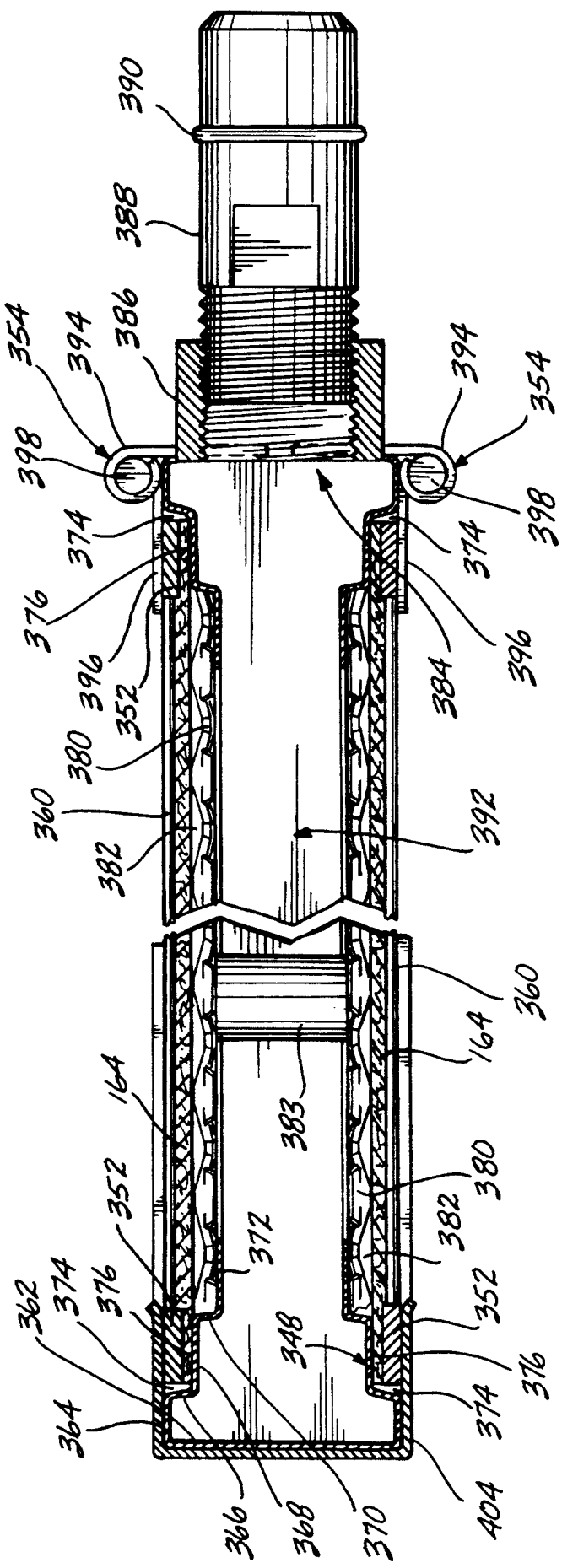

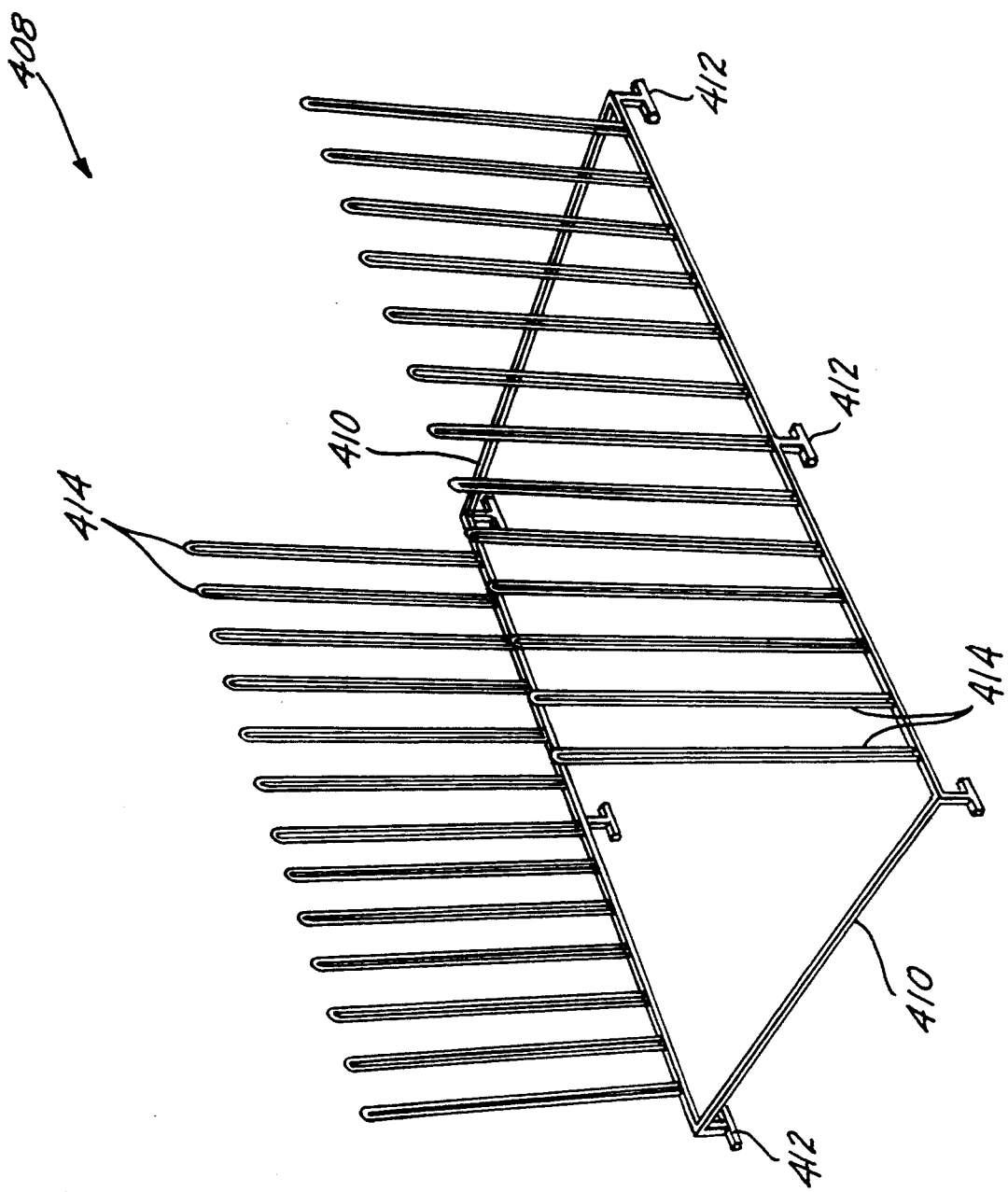

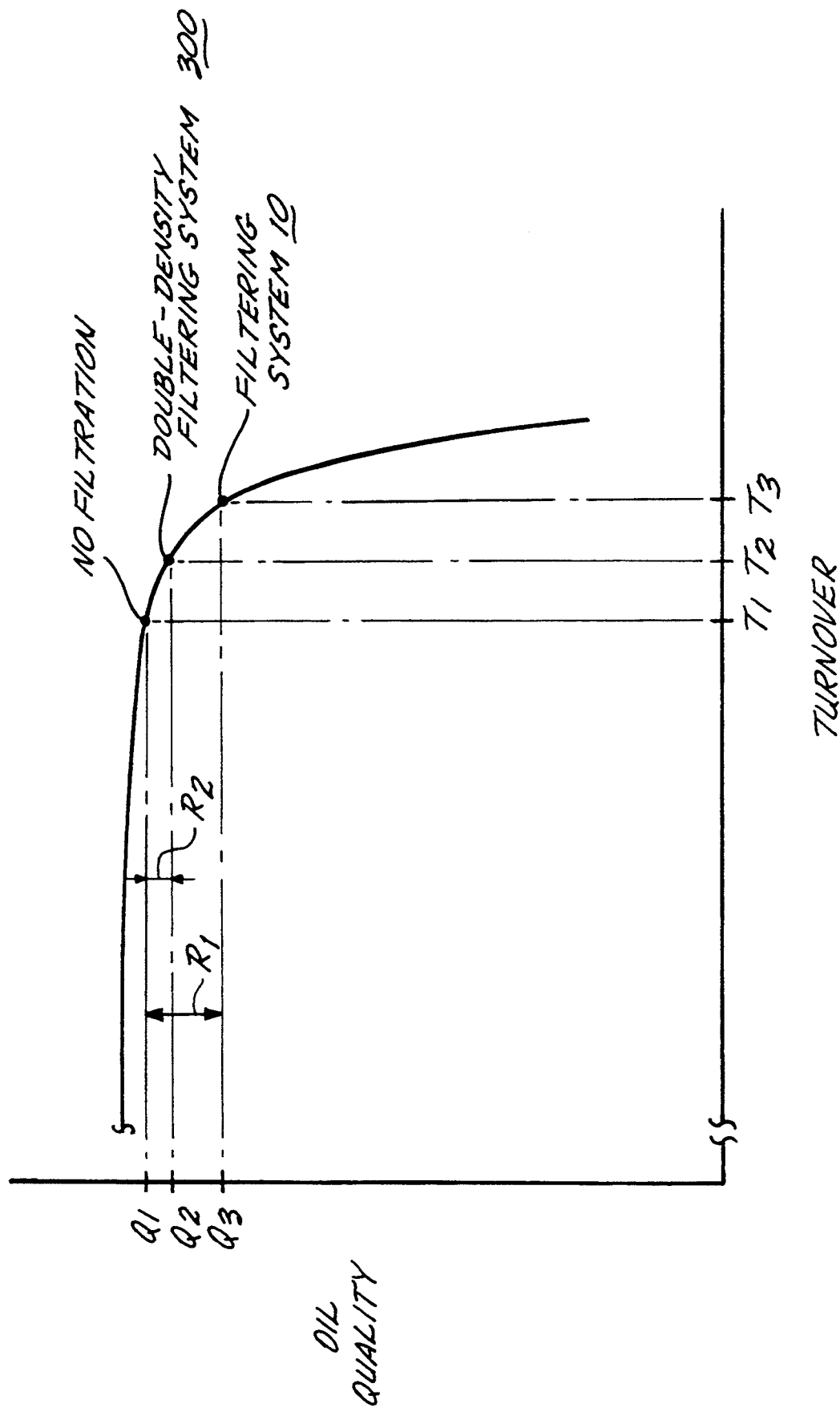

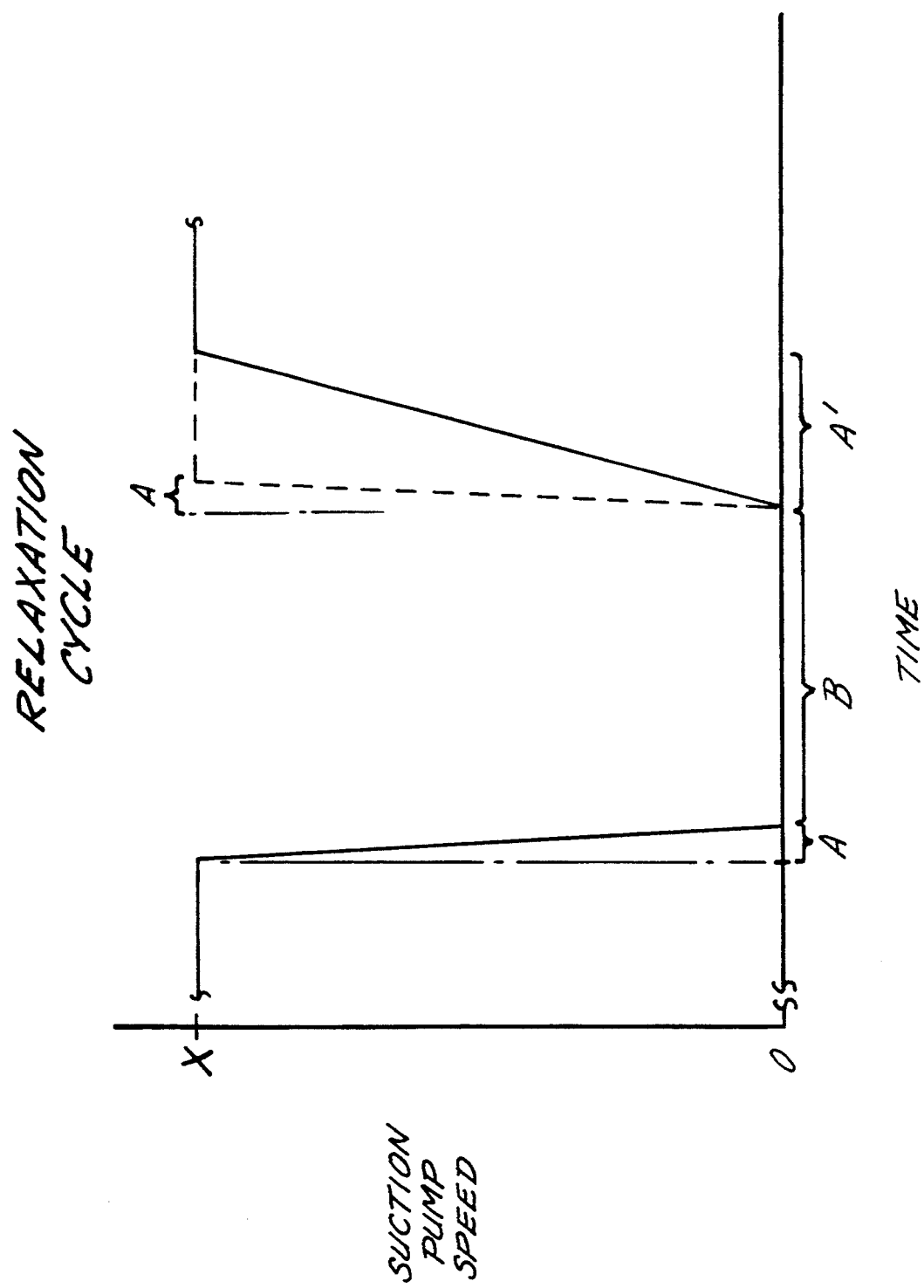

DOUBLE-DENSITY COMMERCIAL FILTERING SYSTEM

RELATED APPLICATIONS

This application is a continuation-in-part of pending prior application Ser. No. 827,944 filed Jan. 29, 1992, which is a continuation-in-part of pending prior application Ser. No. 695,580 filed May 3, 1991 (now U.S. Pat. No. 5,143,604), which is a continuation-in-part of prior application Ser. No. 527,566 filed May 22, 1990 (now U.S. Pat. No. 5,075,000).

TECHNICAL FIELD

This invention relates to commercial filtering systems and, more specifically, to filtering systems particularly useful in filtering hot cooking oil utilized in commercial settings.

BACKGROUND OF THE INVENTION

Cooking oils, such as those used in commercial deep fryers, tend to become contaminated with such things as moisture, food cell bodies, and food plasmas during frying. The oils also tend to break down chemically after extended use, often causing the oil to foam, smoke, smell bad, look bad, or taste bad. It has been found that keeping the cooking oil clean by filtering it on a regular basis tends to extend the useful life of the cooking oil, and increases the quality and appearance of foods which are cooked therein.

A variety of specialized systems and filter media for filtering cooking oil have been developed. Ideally, such filtering systems would remove contaminants from the cooking oil down to a level of about one micron. However, in large-scale industrial applications, such as commercial deep fryers used to cook potato chips or precook French fries, this desired level of ultrafiltration has not been feasible. Current filtering systems being used in this area of application may be broadly segregated into two types—absolute filtering systems and depth filtration systems.

Absolute filtering systems employ a filter medium such as paper or a metal screen (wire cloth), the medium having a discrete pore size. Contaminated cooking oil may be moved through the filter medium by gravity, positive pressure, or vacuum. However, gravity feed is by far the most common due to economic considerations.

While ultrafiltration levels approaching one micron are possible with absolute filtering systems, multiple stages of filter media having incrementally smaller pore sizes must be employed. Such an approach yields an arduous and costly filtering system. Furthermore, such absolute filtering systems possess a poor loading capacity, thereby requiring frequent changeouts of the filter medium. Of course, such changeouts have the detrimental effect of a complete stop in production. Additionally, if a metal screen medium is utilized, cleaning such a screen can be a difficult and time consuming process. The result of these limitations is that, if ultrafiltration approaching one micron is desired, large volumes of contaminated oil simply cannot be economically handled.

Depth filtration systems utilize a filter medium having a substantial depth dimension, which thereby allows contaminants to be removed throughout the entire depth of the medium. This yields an increased loading capacity relative to absolute filtration. Contaminated cooking oil may be moved through the filter medium by positive pressure, as is found, for instance, in plate-and-frame filtering systems. Contaminated cooking oil may also be moved through the filter medium under a vacuum, as is found in rotary vacuum filtering systems. Both systems typically employ the use of a filtering powder (e.g., diatomaceous earth) that is added to the contaminated oil. The filtering powder, which is suspended in the contaminated oil, begins to plate out over a septum (e.g., the porous drum in the rotary vacuum system) during the initial stages of filtering. When a sufficient layer of filtering powder has so formed, a depth filter medium is created over the top of the septum. Gravity feed is not feasible with depth filtration systems, as a force greater than that of gravity is required to move the contaminated cooking oil through the filter medium.

Depth filtration systems utilized in large-scale industrial applications require very large and sophisticated filtering equipment, as well as a good deal of support equipment. Such systems are therefore very expensive. Additionally, while such depth filtration systems can handle large volumes of contaminated oil, they cannot economically achieve filtration levels below approximately 10 microns. These systems also require periodic removal of the filter medium, which leads directly to process down time. In fact, due to the complex nature of the equipment involved, down time may be even longer with such systems than is the case with absolute filtering systems. Additionally, the cleanup process may be complex and time consuming for depth filtration systems and, in the case of positive pressure systems, may be hazardous.

In many commercial fryers, contaminated cooking oil is never directly removed and replaced. Instead, the fryer is replenished with fresh cooking oil to account for that amount of cooking oil leaving the fryer with the product cooked therein. Viewed macroscopically, it can be said that all oil leaves with the product. "Turnover" is the time it takes to add replenishing oil in an amount equaling the fryer volume. Stated differently, turnover is simply the time it takes for a complete volume changeover to occur in the fryer.

It is well known that cooking oil quality drops off exponentially after a certain period of use. One representative reference describing a cooking oil ∝s degradation profile is a paper entitled "*Frying Theory and Practice*" presented by Michael Blumenthal at the University of California-Davis on May 17, 1990. Given this degradation profile, fryers are designed such that turnover occurs prior to the time at which the oil quality begins to precipitously drop.

When an in-line filtering system is added to a fryer, the total system volume is increased. However, the amount of oil leaving the fryer with the product remains constant. The net result is that turnover for the total system is increased, which may be problematic if operation of the fryer is then conducted using heavily degraded oil. Thus, in many areas of application it is extremely advantageous to minimize the volume of the added in-line filtering system.

As a result, there has been a long-felt need for a filtering system and medium combination useful in filtering contaminated cooking oil that: (1) can handle the large volumes of contaminated cooking oil required in large-scale industrial applications; (2) achieves ultrafiltration levels near or below one micron; (3) exploits those attributes incident to depth filtration; (4) is relatively inexpensive to produce; (5) is self-contained, thereby requiring virtually no support equipment; (6) causes no excessive damage to the oil during filtering; (7) ensures proper orientation of the filter medium during the filtering process; and (8) minimizes the increase in total system volume, thereby minimizing the increase in turnover. A similar need exists in the large-scale commercial filtering of other contaminated fluids (e.g., motor oil, etc.). The present invention, when used in conjunction with a currently available filter medium, is directed to satisfying the above-described need.

SUMMARY OF THE INVENTION

In accordance with the present invention, a filtering system used to filter contaminated fluid (such as cooking oil) is disclosed. Associated methods of operation are also disclosed. The filtering system includes a supply pump, a filter tank having a plurality of removable filter cassettes disposed therein, a suction pump, a level control mechanism maintaining a substantially uniform level of fluid within the filter tank, and a control panel housing other process control components. The supply pump draws contaminated fluid from a supply source and feeds it into the filter tank. The suction pump provides the vacuum necessary to draw contaminated fluid through the filter cassettes, and further provides the positive displacement required to return the filtered cooking oil to the supply source.

Filtering takes place within the plurality of filter cassettes. Each filter cassette is configured to house a filter pad in a substantially fluid-tight sealed manner to prevent contaminated fluid from exiting the filter cassette without passing through the filter pad. The filter cassette is further configured to allow only the exit side of the filter pad to rest against an associated seating surface, thereby ensuring proper filter pad orientation.

The disclosed methods of operation include a backflush cycle, a relaxation cycle, and a shear prevention measure. The periodically administered backflush cycle is designed to dislodge contaminants that have built up on the entrance side of the filter pad. During the backflush cycle, forward flow is stopped and the suction pump is started in reverse for one or more short pulses of reverse fluid flow. The periodically administered relaxation cycle is designed to dislodge contaminants accumulated within the interior region of the filter pad. To effect the relaxation cycle, normal forward flow is interrupted for a pause period and then reapplied for a resumption period. This pause period of no flow followed by a resumption period of normal forward flow may be repeated until sufficient internal dislodging of accumulated contaminants has occurred. Use of the backflush cycle and relaxation cycle, whether alone or in combination, significantly adds to the loading life of the filter pad.

Despite the rejuvenation of the filter pad accomplished by the backflush and relaxation cycles, the filter pad eventually reaches a fully loaded state beyond which it cannot be effectively used. As this state is approached, increased resistance to flow through the filter pad results in the frequency of the suction pump outpacing its flow rate, thereby leading to detrimental churning, or shearing, of the filtered fluid. At this point, the shear prevention measure reduces the operating frequency of the suction pump to eliminate any fluid shear.

A double-density filtering system is disclosed. The double-density filtering system employs double-density filter cassettes, each housing a pair of properly oriented filter pads in a substantially fluid-tight sealed manner. This double-pad design allows the volume of the system's filter tank to be cut in half, thereby reducing the detrimental increase in turnover by half The double-density filter cassettes also have a larger void space, or chamber, disposed downstream of the filter pads. This design reduces fluid turbidity, thereby increasing flow performance through the filter pads and extending the useful life of the pads.

A preferred operational approach used during administration of the relaxation cycle is also disclosed. By more slowly restoring normal forward flow during the resumption period (which follows the pause period), there is a significant reduction in damage to filter pad fibers and in compaction of contaminants within the interior regions of the filter pads.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 17 is a perspective view of the double-density filter cassette shown in FIG. 15 in its open position, with associated filter pads exploded from their positions of application;

FIG. 18 is a partial cross-sectional view of the double-density filter cassette shown in FIG. 17, with filter pads in place;

FIG. 19 is a perspective view of a filter cassette rack designed to be retrofit to the filtering system shown in FIG. 1, thereby allowing said filtering system to accommodate double-density filter cassettes;

FIG. 20 is a graph illustrating how cooking oil quality decreases as "turnover" increases; and FIG. 21 is a graph illustrating a preferred operational approach used during administration of the relaxation cycle—namely, a slower resumption of forward flow.

DETAILED DESCRIPTION OF THE PREFERRED EMBODIMENTS

Figure 1:
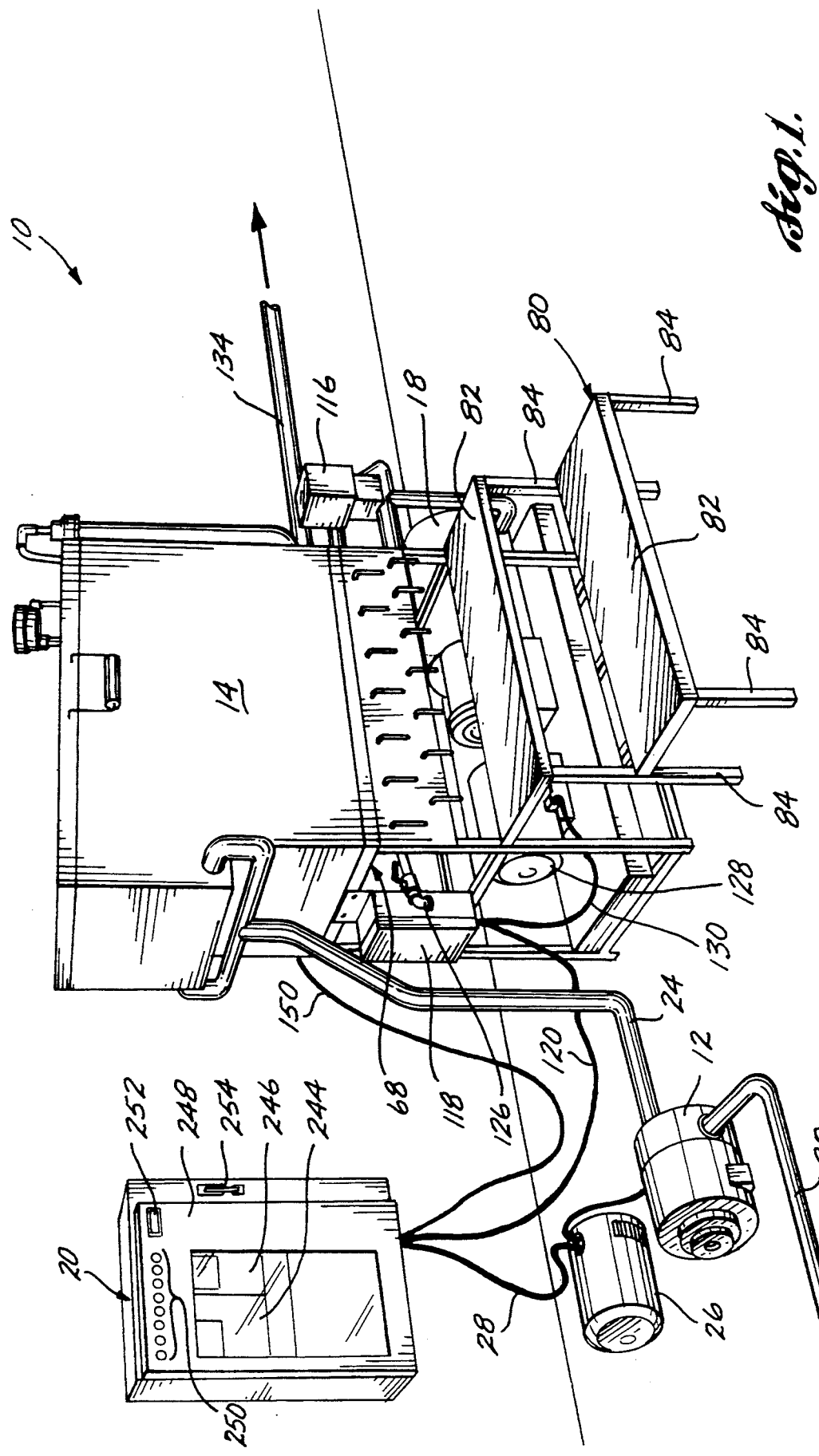
FIG. 1 is an environmental perspective view of a filtering system made in accordance with the principles of the present invention.
Figure 2:
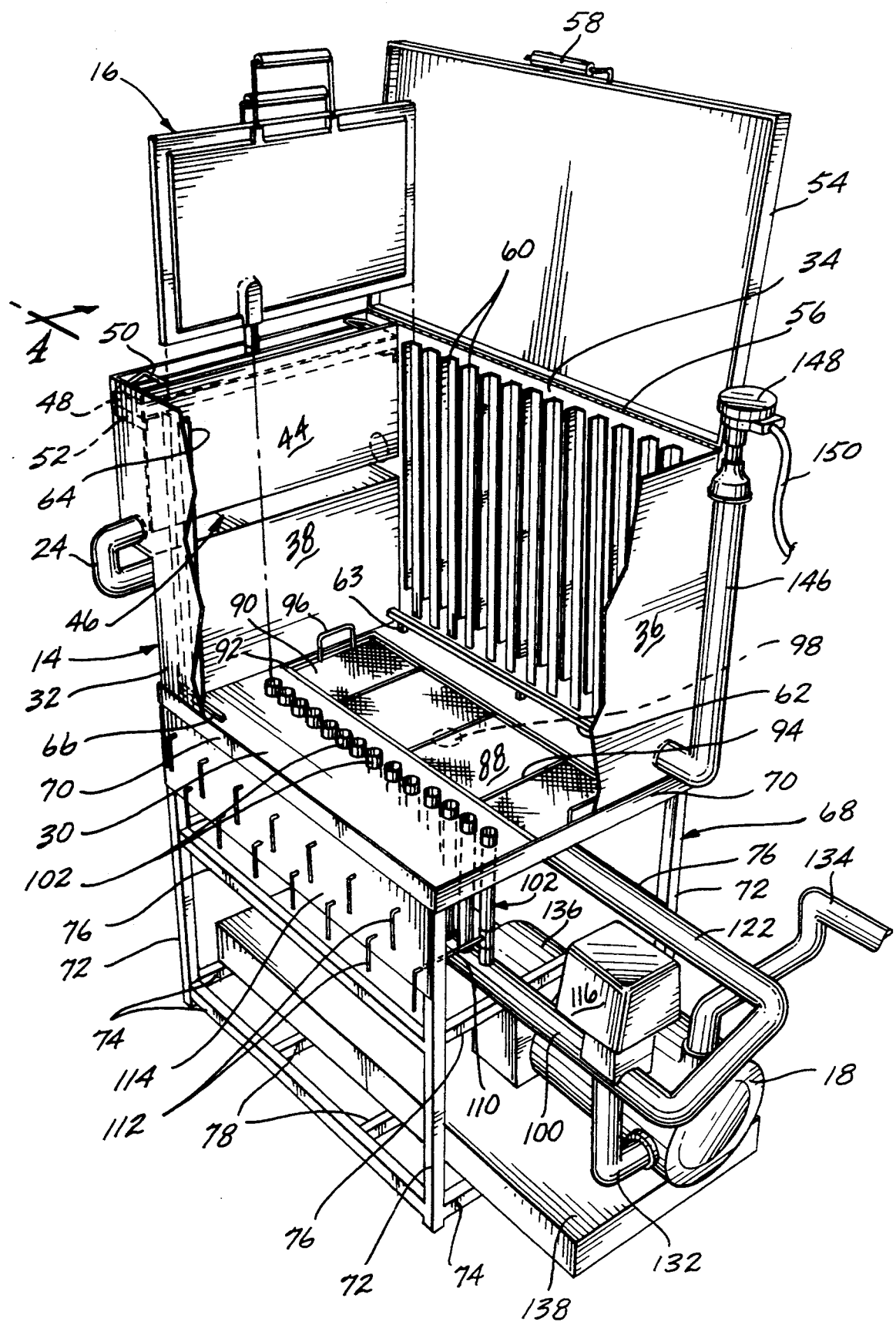
FIG. 2 is a perspective view of the filter tank and surrounding components of the filtering system shown in FIG. 1, said view showing the cover to the filter tank in an open position, a filter cassette exploded from its position of application, and cuts taken through the walls of the tank to better illustrate internally disposed components.

As illustrated in FIGS. 1 and 2, a filtering system 10 formed in accordance with the present invention may be utilized to filter contaminated cooking oil drawn from a large-scale conventional supply source (not shown). A typical example of such a supply source would be a fryer used to cook bulk amounts of potato chips.

The filtering system 10 generally includes a supply pump 12, a filter tank 14 having a plurality of filter cassettes 16 disposable therein, a suction pump 18, and a control panel 20. In short, the supply pump 12 draws contaminated cooking oil from the supply source and feeds it to filter tank 14, wherein the filtering process takes place within the plurality of filter cassettes 16. Suction pump 18 provides the vacuum necessary to draw the contaminated cooking oil through the filter cassettes 16, and provides the positive displacement required to return the filtered cooking oil to the supply source. Monitoring and control of the filtering system 10 is primarily accomplished by components housed within control panel 20.

Referring to FIG. 1, it is illustrated that supply pump 12 is connected at its inlet side to a supply line 22 carrying contaminated cooking oil from the supply source. The discharge side of supply pump 12 is connected to a feed line 24, which introduces the contaminated cooking oil into filter tank 14. A three-phase motor 26, coupled to control panel 20 through a lead 28, drives the supply pump. Supply pump 12 may be of any conventional design (e.g., positive displacement, propeller, centrifugal, etc.), provided that it is of variable speed and capable of being powered by a three-phase motor. In most environments of application, the head that must be provided by supply pump 12 to introduce contaminated cooking oil into filter tank 14 is relatively small. Thus, a positive displacement pump—which is more expensive—is usually not required.

Figure 3:
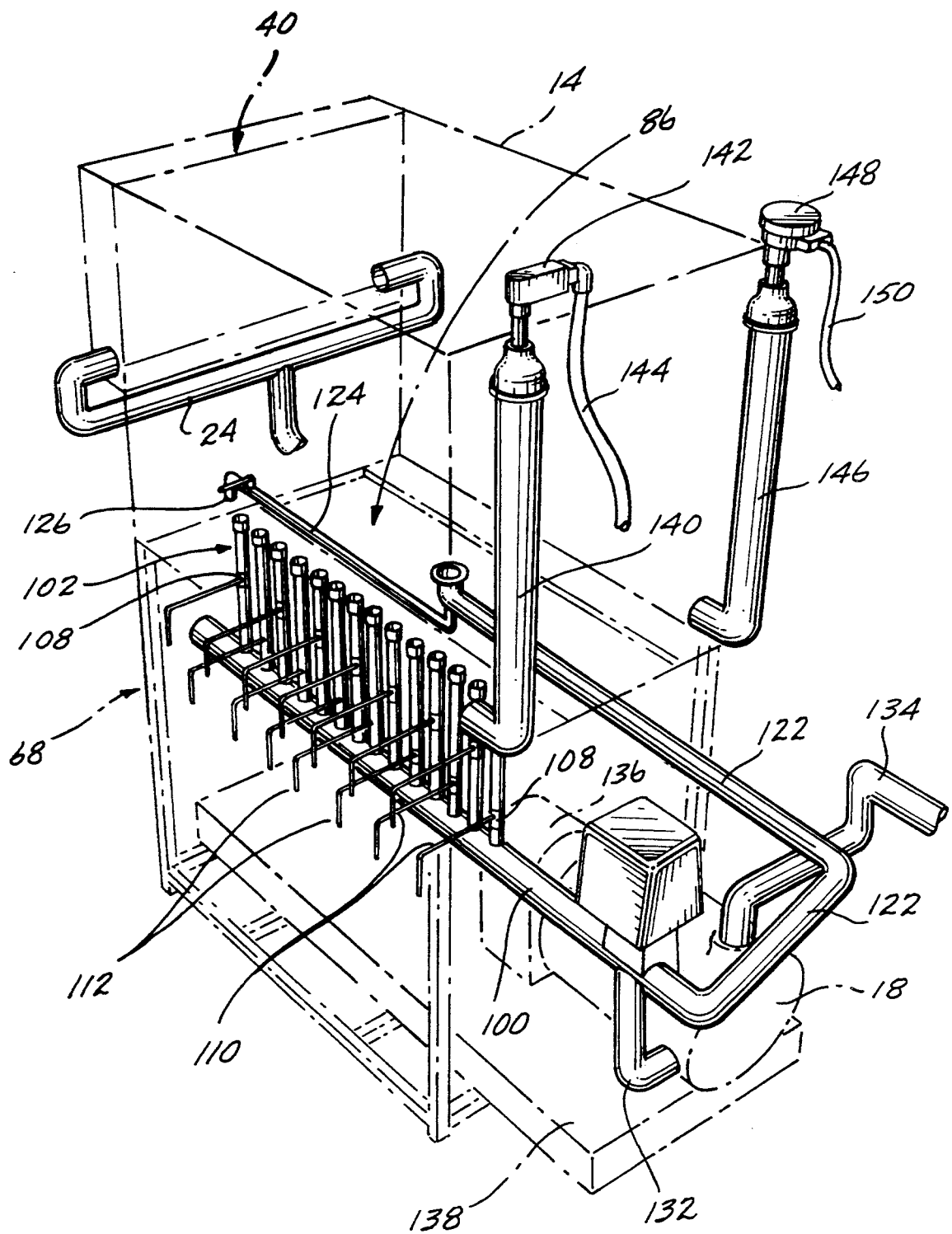
FIG. 3 is a perspective view similar to FIG. 2, said view showing the principal conduits associated with the travel of fluid into and out of the filter tank in solid line and showing the filter tank and most surrounding components in phantom line.
Figure 4:
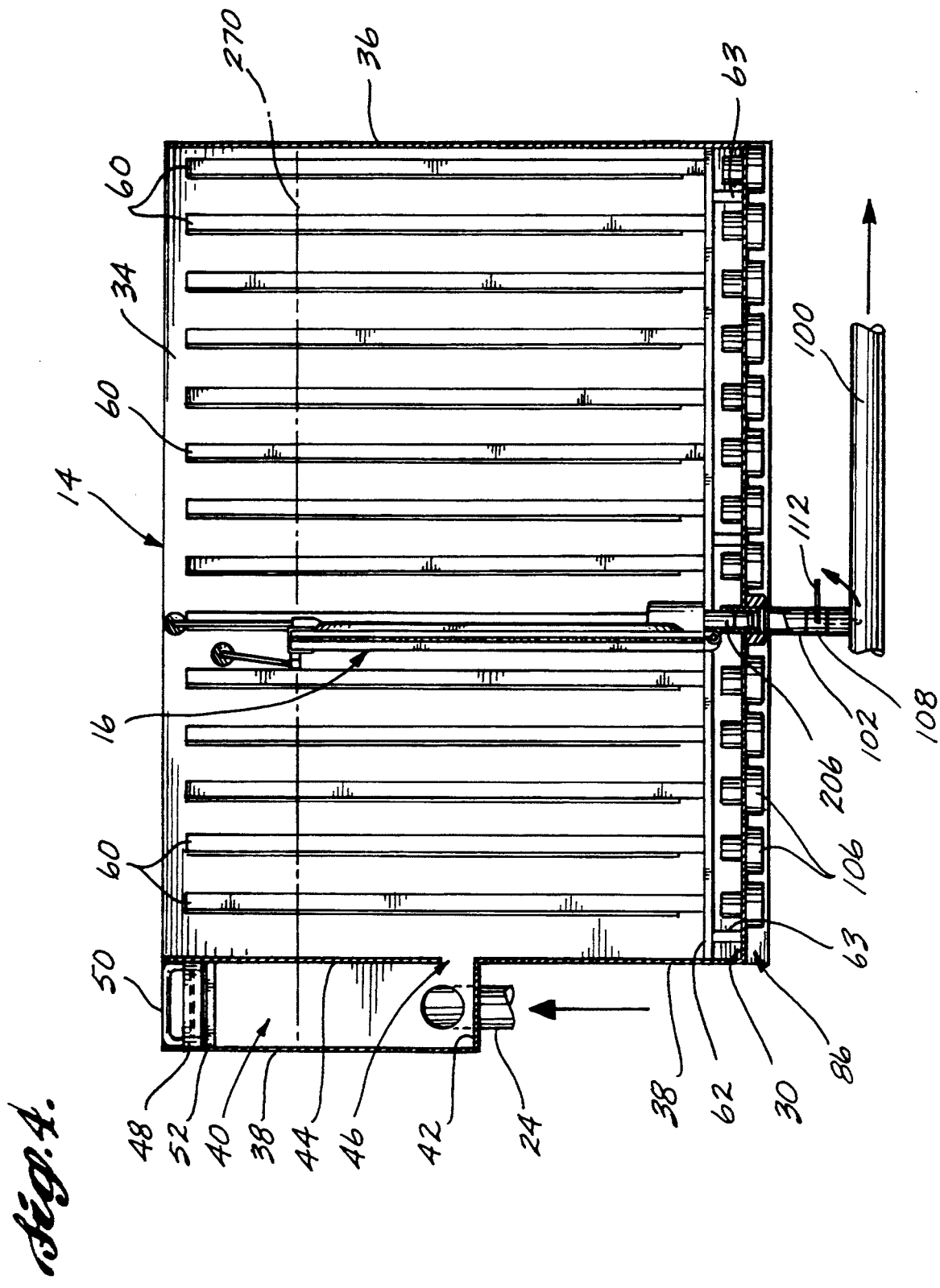
FIG. 4 is a partial cross-sectional side view of the filter tank, showing a filter cassette in place, taken along line 4—4 of FIG. 2.

Referring to FIGS. 2, 3, and 4, it is illustrated that filter tank 14 is of rectangular cross section and has its volume defined by a bottom surface 30, a front sidewall 32, a back sidewall 34, a right end wall 36, and a left end wall 38—the bottom surface being horizontally oriented and the sidewalls and end walls being vertically oriented (see FIG. 2).

The upper portion of left end wall 38 is outwardly disposed from its lower portion to define an intake compartment 40. Intake compartment 40 is also of rectangular cross section and has a horizontally oriented bottom surface 42, disposed at the approximate height-wise midpoint of filter tank 14, that joins the upper and lower portions of left end wall 38 (see FIG. 4). A vertically oriented divider 44, which is coplanar with the lower portion of left end wall 38, extends downwardly from the top of filter tank 14 to a position proximate to, but spaced from, bottom surface 42 to define the inner boundary of the intake compartment 40 and thereby divide the intake compartment from the central volume of filter tank 14. Thus, a supply gap 46 is formed between the lower terminus of divider 44 and the innermost edge of the bottom surface 42 of intake compartment 40, said supply gap introducing contaminated cooking oil to the central volume of filter tank 14.

An opening is formed in both the front and back walls of intake compartment 40 at positions just above bottom surface 42, the openings being sized to receive the feed line 24 connected to the discharge side of supply pump 12 (refer additionally to FIG. 1 ). Feed line 24 is branched at a location just outside intake compartment 40 in order to provide two separate input streams into the intake compartment. This split-stream design decreases the input velocity of the contaminated cooking oil, thereby diminishing splashing concerns and reducing undesirable aeration of the contaminated cooking oil. As is well known, aeration has a detrimental degradation effect on the oil.

To further diminish splashing concerns, a splash screen 48, consisting of a wire mesh screen secured at its perimeter to a rectangular support frame, is disposed within the upper regions of intake compartment 40. Splash screen 48 has a handle 50 disposed on each end, and it is supported at each end within the upper regions of intake compartment 40 by a pair of supports 52. Supports 52 are of double-flange design, one flange supporting the splash screen 48 and one flange being attached to the front or back wall of intake compartment 40 by conventional methods (e.g., welded, bolted, etc. ).

A cover 54, hingedly coupled to the upper portion of back sidewall 34 through a piano hinge 56, has a rectangular perimeter sized to enclose filter tank 14 (see FIG. 2). A centrally located handle 58 is mounted near the front edge of cover 54 by conventional methods. Stops (not shown) are disposed on the outside surface of back sidewall 34 at a location adjacent piano hinge 56 to restrict full rotation of cover 54, thereby providing a convenient and secure open position for the cover.

On the inside surface of back sidewall 34 are mounted fourteen vertically oriented and equally spaced guides 60, the guides being of double-flange configuration. Each guide 60 has a first flange secured to back sidewall 34 by conventional methods. The second flange of each guide 60 extends orthogonally inward from back sidewall 34 toward the central region of filter tank 14. The first flange of each guide 60 terminates at its lower end at a location immediately above and adjacent a support bar 62 of rectangular cross section. Support bar 62, which is supported above the bottom surface 30 of filter tank 14 by three evenly spaced posts 63, extends in length from right end wall 36 to left end wall 38 to bear the weight of filter cassettes 16. The second flange of each guide 60 terminates at its lower end at a location well above support bar 62.

On the inside surface of front sidewall 32 are mounted fourteen vertically oriented and equally spaced guides 64 (see FIG. 2). Guides 64 are of the same double-flange design as guides 60, and are mounted to front sidewall 32 in the same manner that guides 60 are mounted to back sidewall 34. Similarly, the lower end of the mounting flange of each guide 64 terminates at a location immediately above and adjacent a support bar 66, the support bar extending in length from right end wall 36 to left end wall 38. Support bar 66 is also supported above the bottom surface of the filter tank by three evenly spaced posts (not shown). The lower end of the inwardly extending flange of each guide 64 terminates at a location well above support bar 66.

The inwardly extending flanges of guides 60 are aligned with those of guides 64 and are spaced such that guide channels are formed, the guide channels providing a path of insertion and extraction for the filter cassettes 16. In order to provide the maximum number of filter cassettes 16 per unit volume of the filter tank 14, the distance between adjacent guides along both back sidewall 34 and front sidewall 32 is just great enough to allow insertion and extraction of the filter cassettes. While this guide configuration theoretically may prevent side-to-side movement of the filter cassettes 16, no such movement actually occurs once the filter cassettes are properly inserted and seated within the filter tank.

A frame 68 supports filter tank 14 in an elevated position. Frame 68 includes a horizontally oriented rectangular tank support 70 having a support leg 72 extending downwardly from each of its four corners (see FIG. 2). Tank support 70 is of double-flange configuration, the first flange extending upwardly and having a perimeter sized to receive filter tank 14 and the second flange extending horizontally inward to provide a supporting edge upon which the filter tank rests. To provide increased stability to frame 68, a horizontal cross member 74 extends between each support leg 72 near the end of the support leg distal from tank support 70. A horizontal cross member 76 extends between each support leg 72 at a position slightly above the vertical midpoint of the support leg. Additionally, two cross members 78 extend between front and back cross members 74 in an orientation parallel to end cross members 74.

To allow operator access to the interior of filter tank 14, access steps 80 are provided at the front of the filter tank (refer additionally to FIG. 1). Access steps 80 include two horizontally oriented platforms 82 supported at an elevated position by downwardly extending support legs 84. The upper platform 82 is attached by conventional methods to the front cross member 76 of frame 68.

A rectangular lower recessed area, or sump 86, is formed in the bottom surface 30 of filter tank 14 at a location more proximate back sidewall 34 than front sidewall 32 of the filter tank (see FIGS. 2 and 3). Sump 86 extends in length from left end wall 38 to right end wall 36. A sump screen 88, having a wire cloth 90 attached to an outer rectangular frame 92, is disposed within sump 86. Wire cloth 90 is attached to frame 92 in a manner such that the wire cloth is supported at a position slightly above the flat bottom surface of sump 86 when the sump screen 88 is in place. Three support bars 94 extend between the longer sides of frame 92 to provide structural rigidity to sump screen 88. Upwardly extending handles 96 are disposed at the shorter sides of frame 92 to provide for easy insertion and removal of the sump screen. A centrally located drain aperture 98 is formed in the bottom surface of sump 86.

A hollow cylindrical manifold 100 is horizontally disposed beneath the bottom surface 30 of filter tank 14 at a position parallel to and between sump 86 and front sidewall 32 of the filter tank (see FIGS. 3 and 4). Fourteen hollow cylindrical risers 102 extend upwardly from manifold 100 through bottom surface 30 of filter tank 14 to terminate at a location slightly above the bottom surface. The inside surface of the upper terminal end of each riser 102 acts as the female portion of a slip coupling by being configured to receive the male portion of filter cassette 16 in a manner described below. A sealer mount 106, which extends snugly around the outer periphery of each riser 102, is disposed immediately below the bottom surface 30 of filter tank 14. Sealer mount 106 serves to maintain the upper terminal end of each riser 102 in a secure position, and further serves to prevent leakage of contaminated cooking oil from the filter tank at the location where the riser passes through bottom surface 30.

A control valve 108 is disposed within each riser 102 at a location along the central portion of each riser. Each control valve 108 is manually operated through an actuator 110 which extends orthogonally outward from the control valve to a position beyond the plane defined by the front sidewall 32 of filter tank 14. At this position, the actuator 110 bends approximately ninety degrees to terminate in a short handle portion 112. Prior to making this ninety-degree bend, each actuator 110 passes through an opening formed in an actuator plate 114, the actuator plate being mounted at its ends to the two front support legs 72 of frame 68 at a position immediately adjacent and below tank support 70 (see FIG. 2). The control valves 108 and actuators 110 of successive risers 102 are vertically staggered so that the handle portions 112 of successive risers do not interfere with one another during operation. When the handle portion 112 of each actuator points in a downward direction, control valve 108 is in an open position. When the handle portion 112 is rotated approximately ninety degrees in a counterclockwise direction, the control valve 108 is in a closed position, thereby preventing passage of cooking oil from filter tank 14 to manifold 100. Using a separate control valve and actuator for each riser allows all of the inserted cassettes, or only a fraction thereof, to be utilized during filtering operations.

The end of manifold 100 proximate left end wall 38 is closed. The opposite end of manifold 100 terminates at a three-way valve 116 disposed outward of the frame 68, the operation of the three-way valve being described below. A lead (not shown) connects three-way valve 116 to a junction box 118 mounted to the left side of frame 68 at a position between tank support 70 and cross member 76 (refer additionally to FIG. 1). Junction box 118 is in turn connected to control panel 20 through a lead 120.

A principal drain line 122 horizontally disposed below the bottom surface 30 of filter tank 14 has an open end terminating at three-way valve 116 (see FIGS. 2 and 3). The opposite open end of principal drain line 122 has a ninety degree elbow formed therein to thereby extend vertically upward to connect with the drain aperture 98 formed in the bottom surface of sump 86. At this ninety degree elbow, a secondary drain line 124 of smaller diameter is coupled to principal drain line 122. Secondary drain line 124 extends vertically downward a short distance from its point of attachment, turns approximately ninety degrees, and then extends to a position slightly outward of frame 68 to terminate in a manually controlled spigot 126. As will be described in greater detail below, the secondary drain line and spigot are utilized during manual cleaning of the filter tank 14.

Suction pump 18 is a variable-speed, reversible pump powered by a motor 128, which is connected to junction box 118 through a lead 130 (refer additionally to FIG. 1). The inlet side of suction pump 18 is coupled to three-way valve 116 through an inlet line 132. The discharge side of suction pump 18 is coupled to a return line 134 which transports cooking oil back to the supply source (e.g., fryer, etc.). Because the suction pump must draw cooking oil under vacuum from the filter tank 14 (which is open to atmosphere), and must discharge the cooking oil into return line 134 under positive pressure, suction pump 18 is preferably a positive displacement pump. As will be described below, the suction pump must be capable of running at variable speeds in order to practice the method of operation of the present invention. A gearbox 136 may be employed to better match the suction pump's rated capacity to the design specifications of motor 128. Suction pump 18, gearbox 136, and motor 128 are secured to the upper surface of a platform 138, which is in turn secured to the upper surfaces of cross members 74 and 78 of frame 68.

A hollow cylindrical still well 140 is formed in the lower portion of the right end wall 36 of filter tank 14 at a location proximate front sidewall 32 (see FIGS. 2 and 3). Still well 140 has a short horizontal section secured to right end wall 36 around an aperture formed therein, a ninety degree elbow section, and a lengthy vertical section that extends upwardly to a height near the top of filter tank 14. As a result, the level of cooking oil within still well 140 matches the level of cooking oil within filter tank 14.

An emergency shutoff mechanism 142 is mounted within the vertical section of still well 140, the mechanism being designed to cease operation of the filtering system 10 when the cooking oil level within the filter tank rises above an upper predetermined level. While many conventional devices may function as the emergency shutoff mechanism 142, a standard float switch is both economically and operationally preferable. A lead 144 connects emergency shutoff mechanism 142 to junction box 118.

A hollow cylindrical still well 146 is formed in the lower portion of the right end wall 36 of filter tank 14 at a location proximate back sidewall 34. Still well 146 has a short horizontal section secured to right end wall 36 around an aperture formed therein, a ninety degree elbow section, and a lengthy vertical section that extends upwardly to a height near the top of filter tank 14. As a result, the level of cooking oil within still well 146 matches the level of cooking oil within filter tank 14.

A level control mechanism 148 is mounted within the vertical section of still well 146, the level control mechanism being connected directly to control panel 20 through a shielded lead 150. A dedicated and shielded lead to control panel 20 is preferable in order to keep static interference levels at a minimum. Level control mechanism 148 includes a capacitive fluid level probe and a pre-amplifier, the probe sensing the cooking oil level within still well 146 (and thereby within the filter tank) and the pre-amplifier boosting and transmitting the probe signal to control panel 20 through lead 150. The amplified probe signal is received by a controller (not shown) housed within control panel 20, the controller being interactively connected to supply pump 12 through an inverter (described below) to thereby control the pump's operating speed. Thus, level control mechanism 148 allows an essentially constant cooking oil level to be maintained within filter tank 14.

FIGS. 5, 6, 7, and 8 illustrate that the filter cassette 16 generally includes a housing 152 having a fixed handle 154, a sealing frame 156 coupled to the housing by three spaced hinges 158, and a handle 160 pivotally mounted to the sealing frame. Handle 160 includes a pair of spaced latches 162 sized to engage housing 152 to hold the filter cassette 16 in its closed operative position. A filter pad 164 is adapted to be contained within a recess formed in housing 152.

Filter pad 164 is substantially rectangular, having an entrance side 166 and an opposing exit side 168. The filter pad is preferably formed with a larger mean pore size at the entrance side 166 than at the exit side 168. This pore size gradient allows larger contaminants to be removed upon their initial contact with the filter pad, whereas smaller contaminants are removed at locations deeper within the filter pad. Optionally, the entrance side 166 may be formed with a bumpy, rather than a relatively flat, surface to thereby increase the total surface area available for removal of the larger contaminants.

A seating cut-out 170 is formed in filter pad 164 by cropping one of its corners. Alternatively, such cropping may be eliminated if the filter pad is initially constructed to have the same peripheral configuration. As detailed below, it is the seating cut-out 170 that ensures filter pad 164 is properly oriented within filter cassette 16. Filter pad 164 should also have a thickness and compressibility necessary to form the required fluid-tight seal when the filter cassette 16 is in its closed operative position (shown in FIG. 6 and described below).

One such filter pad possessing these physical characteristics and the desired filtering properties is a filter pad (Product No. IF-17) commercially sold by Filtercorp, Inc. of Woodinville, Wash. This filter pad is composed of a cellulose fiber matrix having active filtering ingredients (e.g., activated carbon, etc.) bound within the matrix. As stated above, the filter pad has a mean pore size gradient across its depth dimension. Use of this particular filter pad in the filtering system 10 of the present invention allows effective filtering of contaminants down to a level of 0.5 microns.

Sealing frame 156 is a thin, substantially rectangular plate having a large, centrally located inlet opening 172 through which the contaminated cooking oil enters. An inner rib 174 and a spaced-apart outer rib 176 are integral with, and extend about the entire periphery of, the inside surface of sealing frame 156 (see FIG. 6). Inner rib 174 projects orthogonally outward from the inner surface of sealing frame 156 and terminates in a flat inner filter pad contact edge 178. Similarly, outer rib 176 projects orthogonally outward from the inner surface of sealing frame 156 and terminates in a flat outer filter pad contact edge 180. The ribs 174 and 176 have a peripheral configuration and dimension substantially matching, but slightly less than, that of filter pad 164. Accordingly, ribs 174 and 176 have one notched corner corresponding to the seating cut-out 170 of the filter pad. Thus, when filter cassette 16 is in its closed operative position, and filter pad 164 is in place, the contact edges 178 and 180 of ribs 174 and 176, respectively, form two peripheral lines of seal which ensure that the contaminated cooking oil passes through, rather than around, the filter pad.

Four spaced filter pad support rods 182 extend from the side of sealing frame 156 to which handle 160 is pivotally mounted to the opposite side of the sealing frame (i.e., across the shorter dimension of inlet opening 172).

Figure 6:
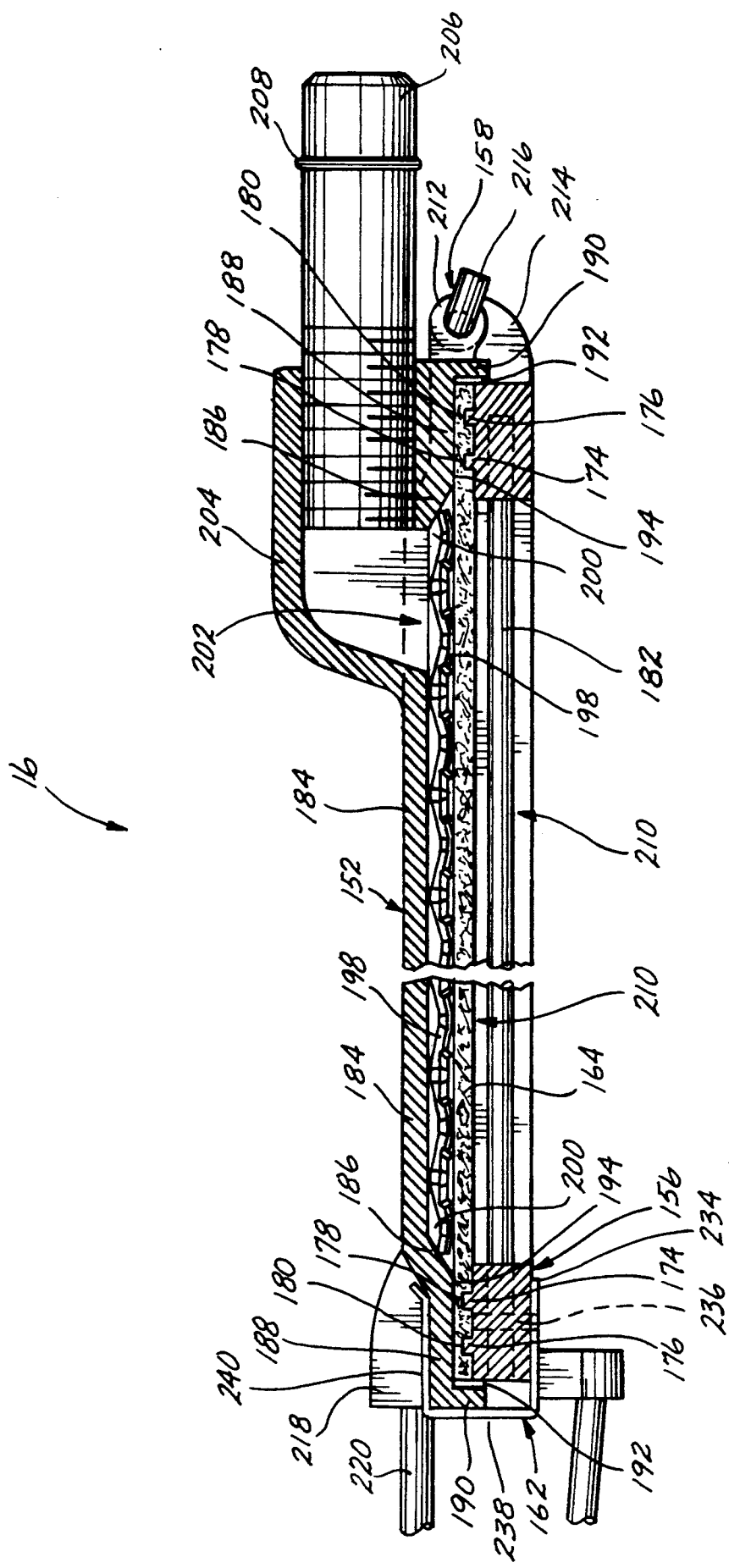
FIG. 6 is a partial cross-sectional view of the filter cassette shown in FIG. 5, with filter pad in place.
Figure 7:
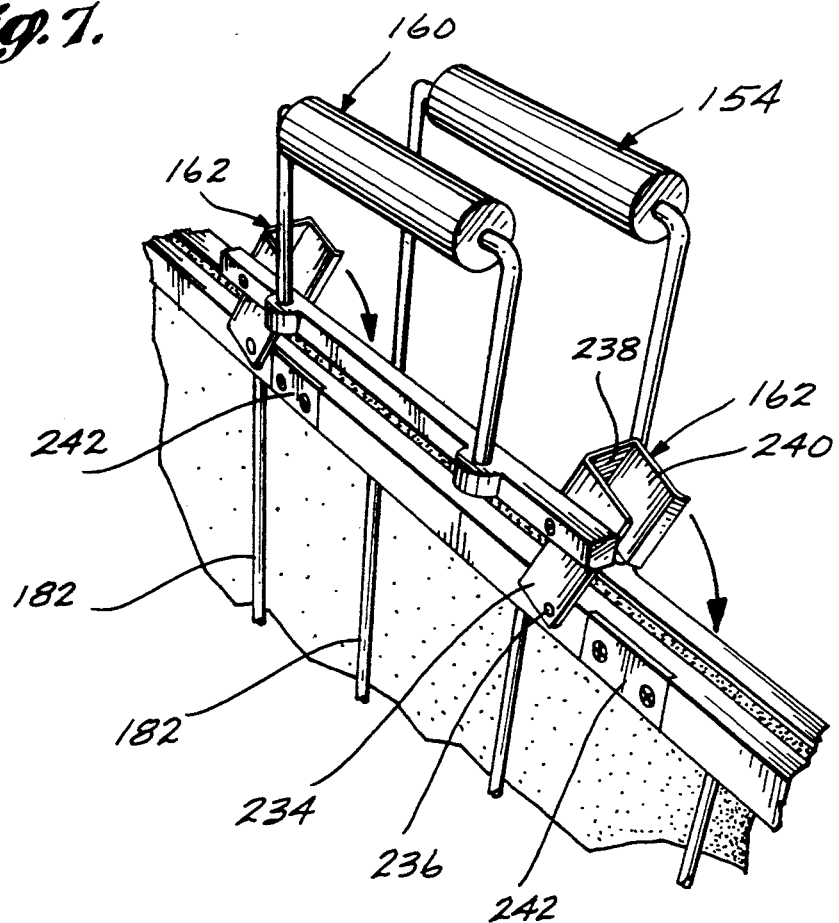
FIGS. 7 and 8 are perspective detail views showing the handling and latching features of the filter cassette shown in FIG. 5.

When oriented as shown in FIG. 6, housing 152 has a flat, centrally located, horizontally oriented upper surface 184; a peripheral, downwardly sloping angled edge 186 contiguous with upper surface 184; a peripheral, horizontally oriented lower surface 188 contiguous with angled edge 186; and a peripheral, downwardly projecting outer edge 190 contiguous with lower surface 188. Of course, FIG. 2 clearly illustrates that filter cassette 16 is actually oriented some ninety degrees from the orientation shown in FIG. 6 when the filter cassette is placed in its operational position within filter tank 14. The inner peripheral dimension of the outer edge 190 of housing 152 only slightly exceeds the outer peripheral dimension of sealing frame 156, so that a relatively snug fit exists between the housing and sealing frame when the filter cassette 16 is in its closed operative position. However, the fit is not so snug as to interfere with the operation of the hinges 158.

As shown in FIG. 6, the lower surface 188 and outer edge 190 of housing 152 define a recess 192 sized to receive the filter pad 164. The bottom of lower surface 188 provides a seating surface 194 against which the periphery of the filter pad is positioned. Lower surface 188, and therefore seating surface 194, have a peripheral configuration and dimension substantially matching, but slightly greater than, that of filter pad 164. Accordingly, seating surface 194 has one notched corner corresponding to the seating cut-out 170 of the filter pad. This notched corner configuration is defined by a solid corner 196 which extends downwardly from lower surface 188 of housing 152 the same distance as does outer edge 190 (see FIG. 5). It is this configuration of seating surface 194 and solid corner 196 that provides proper filter pad orientation by ensuring that only exit side 168 of filter pad 164 may rest against the seating surface. In short, the filter pad fits only one way. When the filter cassette 16 is in its closed operative position, the filter pad 164 is gripped between the seating surface 194 and the inner and outer ribs 174 and 176 of sealing frame 156 to provide a substantially fluid-tight seal.

Figure 5:
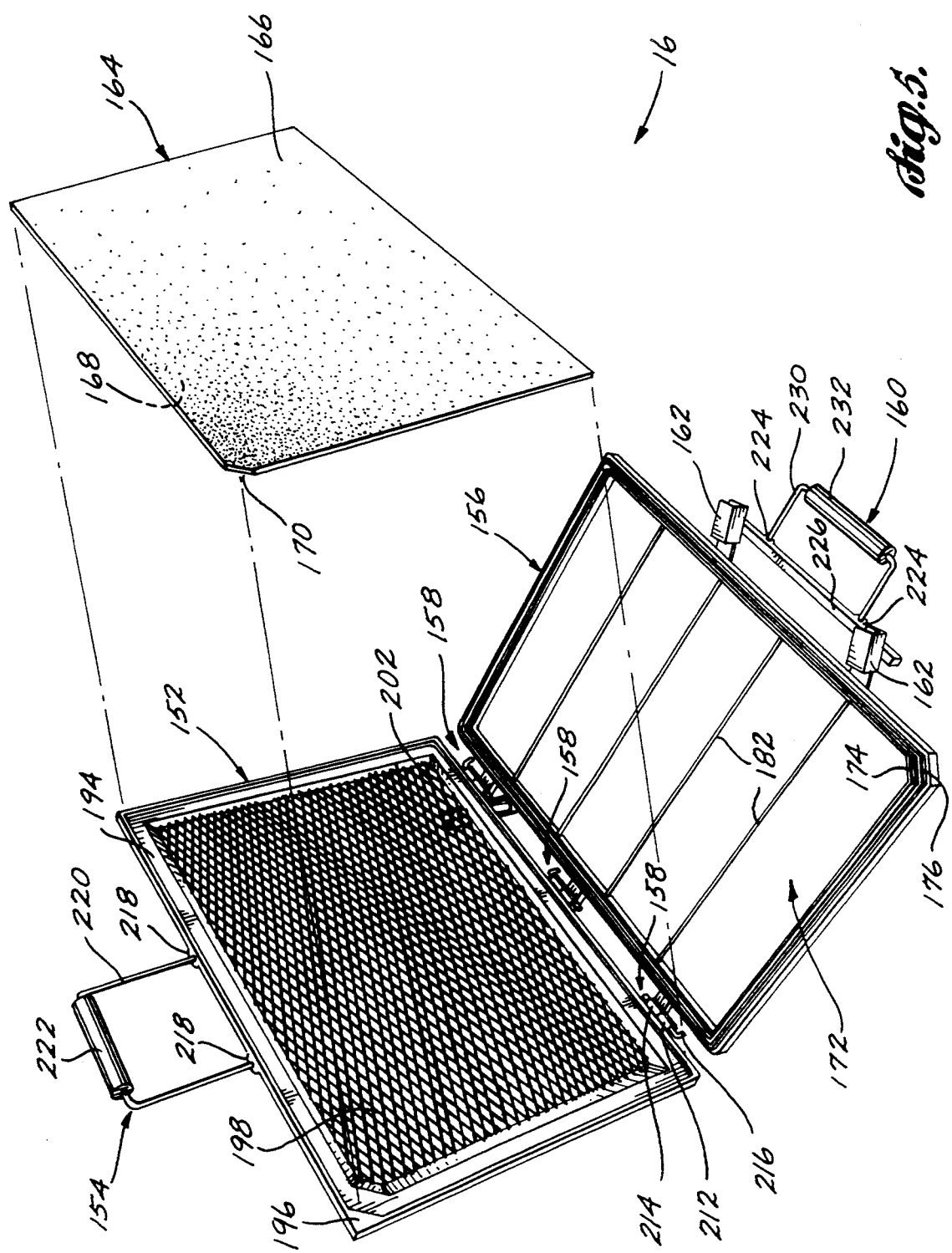
FIG. 5 is a perspective view of the filter cassette shown in FIG. 2 in its open position, with an associated filter pad exploded from its position of application.

A filter pad support screen 198 is mounted within a recess 200 defined by the upper surface 184 and angled edge 186 of housing 152 (see FIGS. 5 and 6). Preferably, the filter pad support screen is welded into place. Filter pad support screen 198 is an expanded metal matrix, with each matrix member having a substantially parallelogram-shaped cross section. Thus, filter pad support screen 198 provides a support surface for filter pad 164 in the central region of housing 152, while at the same time contacting only a minuscule portion of the surface area on the exit side 168 of the filter pad. Given this minimal area of contact, virtually no impedance is provided to the free flow of contaminated oil through the filter pad.

An outlet aperture 202, through which the filtered cooking oil exits, is formed in the upper surface 184 of housing 152 (see FIG. 6). Viewing housing 152 in the open position illustrated in FIG. 5, outlet aperture 202 is formed in upper surface 184 at a position adjacent and slightly inward of the right outer hinge 158. A raised shroud 204 integral with upper surface 184 surrounds the outlet aperture. A threaded bore is formed in the outward portion of raised shroud 204, the threaded bore being sized to receive the threaded end of a hollow cylindrical male coupling 206. Near the end of male coupling 206 distal from its end of threaded attachment, a circular recess sized to receive a resilient O-ring 208 is formed. As shown in FIG. 4, the male coupling 206, with resilient O-ring 208 in place, is received within the upper terminal end of riser 102 in slip coupling fashion to provide a sealed connection between filter cassette 16 and the riser. In this way, the vacuum applied by suction pump 18 draws contaminated cooking oil through the filter pad 164 and delivers filtered cooking oil into manifold 100 through riser 102 (when control valve 108 is in its open position).

Three spaced-apart hinges 158 hingedly couple the sealing frame 156 to the housing 152, such that a chamber 210 is formed when the sealing frame and housing are pivoted to the closed operative position (shown in FIG. 6). Chamber 210 is perhaps best viewed as the combination of the space formed by the recesses 192 and 200 of housing 152 and the space corresponding to inlet opening 172 of sealing frame 156. Each hinge 158 has a gudgeon 212 integral with housing 152 and disposed outwardly of outer edge 190. For the two outer hinges, a gudgeon 214 integral with sealing frame 156 is configured to be disposed immediately adjacent, inside of, and axially aligned with gudgeon 212. For the center hinge, a center gudgeon 214 integral with sealing frame 156 is disposed immediately adjacent and axially aligned with center gudgeon 212, but may be disposed on either side of the center gudgeon 212. Gudgeons 212 and 214 have central bores that are axially aligned and sized to receive a pin 216 which permits rotation of the gudgeons around the pin, thereby providing a hinged coupling of sealing frame 156 and housing 152. Pin 216 is easily removable from the central bores to provide easy and effective cleaning of the filter cassette components.

Handle 154 extends orthogonally outward from two mounting protuberances 218 integral with the lower surface 188 of housing 152, the mounting protuberances being positioned so that the handle is disposed at the approximate midpoint of the side of housing 152 opposite hinges 158. Handle 154 includes a U-shaped rod 220, which has a cylindrical handgrip 222 mounted to its middle section (i.e., the section distal from housing 152).

Handle 160 extends orthogonally outward from two centrally disposed mounting protuberances 224 integral with a handle support bar 226. Handle support bar 226 is pivotally attached to the two spaced latches 162, which are in turn pivotally attached to the surface of sealing frame 156 opposite that bearing ribs 174 and 176. Handle 160 includes a U-shaped rod 230 and a cylindrical handgrip 232 similar to these same components in handle 154, except that U-shaped rod 230 extends a shorter distance from mounting protuberances 224 than is the case with handle 154.

Each latch 162 includes a flat mounting portion 234 pivotally mounted to sealing frame 156 by a rivet 236; a flat, orthogonally extending bridging portion 238 contiguous with mounting portion 234; and a predominantly flat sealing portion 240 extending orthogonally from and contiguous with bridging portion 238 (see FIG. 6). Thus, mounting portion 234 and sealing portion 240 are in spaced parallel orientation, the space between being defined by the widthwise dimension of bridging portion 238. As shown in FIG. 6, this widthwise dimension of bridging portion 238 is such that contact edges 178 and 180 of sealing frame 156 compress the filter pad 164 to create a substantially fluid-tight seal at the junction of sealing frame 156 and housing 152 when the filter cassette 16 is held in a closed operative position by latches 162.

While the filter cassette 16 need not be limited to a single material of composition, its major components (including housing 152 and sealing frame 156) are preferably formed of aluminum to facilitate the manufacturing process. However, because latches 162 are formed of stainless steel, two stainless steel latch plates 242 are mounted to sealing frame 156 at locations designed to engage the mounting portion 234 of latches 162 when handle 160 is moved to its closed position (see FIGS. 7 and 8). Thus, undesirable engagement between stainless steel and aluminum is avoided. While not so illustrated, stainless steel latch plates may also be mounted to housing 152 at locations designed to engage the sealing portion 240 of latches 162.

Figure 8:
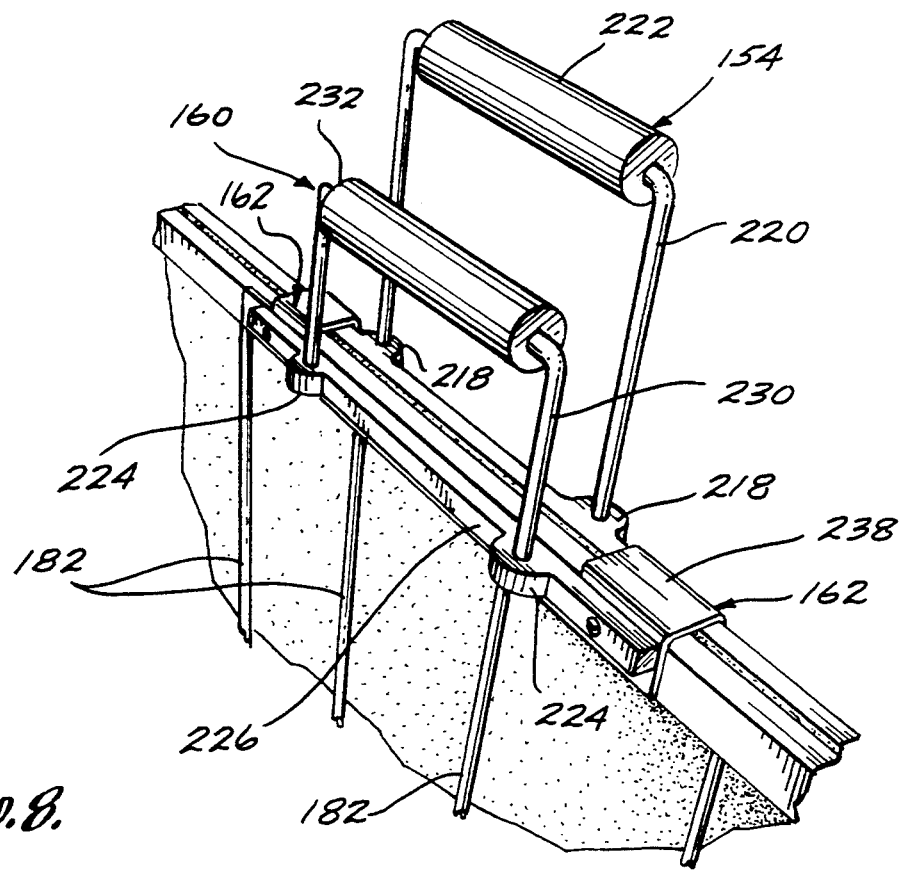

Referring to FIG. 8, it will be appreciated that when handle 160 is moved to its closed position, the U-shaped rod 220 of handle 154 and the U-shaped rod 230 of handle 160 are aligned. However, handgrip 222 is disposed significantly farther away from the closed and secured housing and sealing frame than is handgrip 232. This staggered handle design allows the filter cassette 16 to be inserted into, and removed from, filter tank 14 by handle 154 alone. This capability eliminates inadvertent opening of the filter cassette because handles 154 and 160 cannot be grasped in tandem. Were they not of staggered design, the force exerted by grasping the handles would naturally apply a force that may loosen, if not disengage, latches 162.

Referring to FIG. 1, it is illustrated that control panel 20 is mounted to an environmental structure (e.g., wall, etc.) at a location near filter tank 14. Control panel 20 has disposed within it an inverter 244 controlling the speed of supply pump 12 and an inverter 246 controlling the speed of suction pump 18, the speed of each pump thereby determining the rate of cooking oil flowing through the pump. Inverter 244 is controlled by level control mechanism 148, whereas inverter 246 has four pre-programmed settings corresponding to the most common flow rates utilized in the environment of application.

While not shown, control panel 20 also houses a programmable process logic controller (PLC) which is interactively coupled to inverters 244 and 246, three-way valve 116, and control switches (described below) disposed on the front door of control panel 20. As described below, the PLC may activate or deactivate the inverters, and orient the three-way valve, either according to its own internal programming or upon actuation of the control switches. An analog device, disposed within control panel 20 but also not shown, is interactively coupled to the PLC and receives direct input from inverter 244 as to the speed (and therefore the flow rate) of supply pump 12.

Emergency shutoff mechanism 142 is coupled to a power control relay (not shown) through lead 144, junction box 118, and lead 120. When the level of cooking oil within filter tank 14 rises above an upper predetermined level, emergency shutoff mechanism 142, acting through the power control relay, cuts all control power in the control panel 20, thereby causing the inverters 244 and 246 to stop supply pump 12 and suction pump 18, respectively.

Control panel 20 has a front door 248 upon which are mounted eight control switches 250, collectively, and a digital display 252. An emergency throw switch 254 is mounted on the front face of control panel 20 adjacent front door 248, the emergency throw switch being capable of cutting all line power to control panel 20 and, correspondingly, to the entire filtering system 10.

Figure 9:
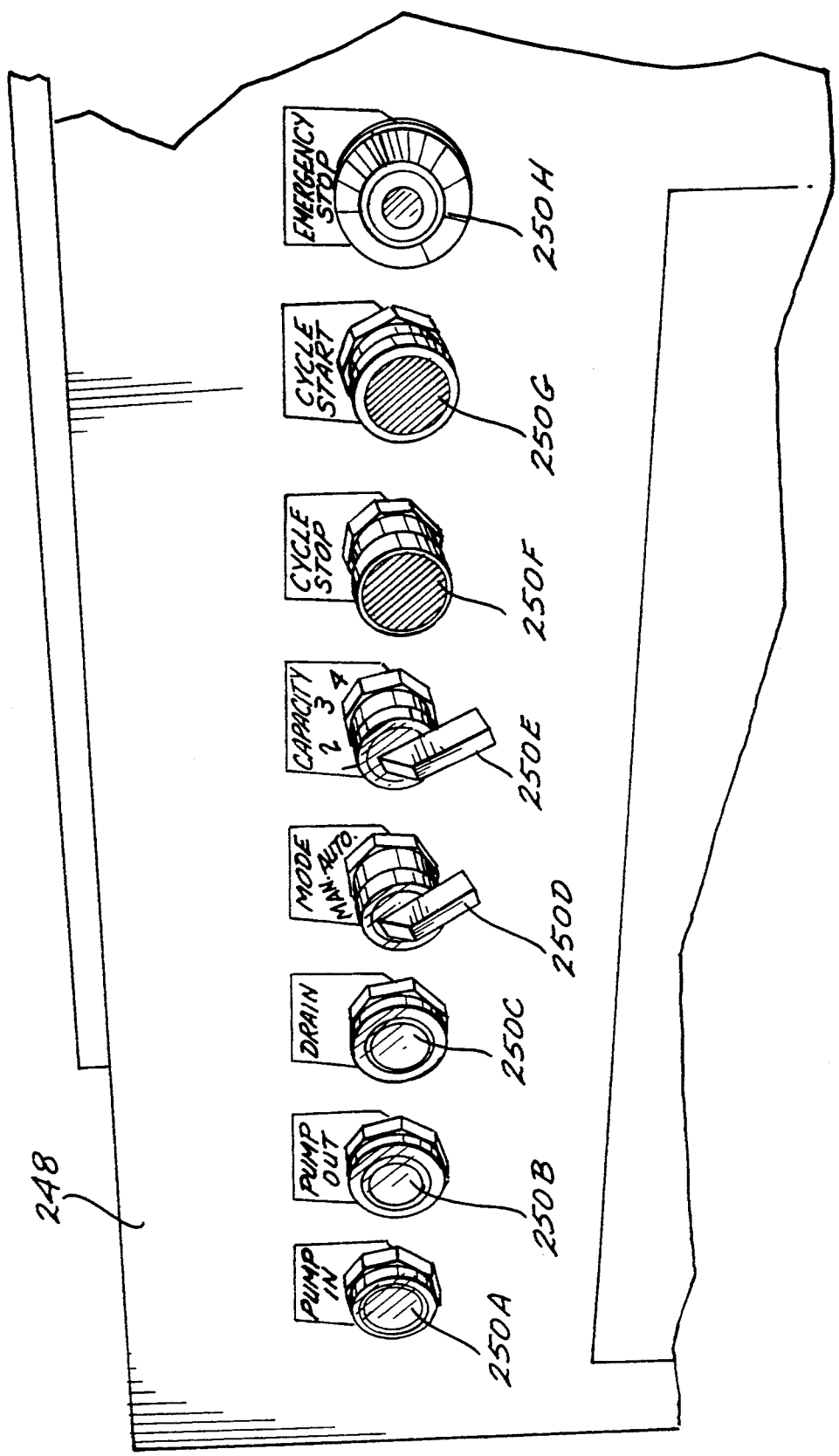
FIG. 9 is a detail view of control switches disposed on the front face of the control panel of the filtering system shown in FIG. 1.

Details of the eight control switches 250 are best comprehended by reference to FIG. 9. Control switch 250A, labeled "Pump In," is a pushbutton switch which is operable only when the filtering system 10 is in its manual mode of operation (see description of control switch 250D below). While being depressed, control switch 250A causes supply pump 12 to introduce contaminated cooking oil into filter tank 14.

Control switch 250B, labeled "Pump Out," is a pushbutton switch which also is operable only in the manual mode of operation. While being depressed, control switch 250B causes suction pump 18 to draw cooking oil from filter tank 14 and to discharge the oil through return line 134.

Control switch 250C, labeled "Drain," is a pushbutton switch operable only in the manual mode of operation. While being depressed, control switch 250C causes three-way valve 116 to reorient to allow suction pump 18 to draw cooking oil from filter tank 14 through principal drain line 122, rather than through manifold 100, and to discharge the oil through return line 134. As will be described below, use of control switches 250A, 250B, and 250C in the filtering system's manual mode of operation occurs principally during cleanup operations.

Control switch 250D, labeled "Mode," is a selector switch which may be moved between a manual mode of operation position and an automatic mode of operation position.

Control switch 250E, labeled "Capacity," is a selector switch which may be moved between four positions bearing the demarcations "1,+ "2," "3," and "4," respectively. These demarcations correspond to preset settings for inverter 246, and therefore to common desired speeds (and flow rates) for suction pump 18. Control switch 250E may be required, for example, where the filtering system 10 services between one and four supply sources.

Control switch 250F, labeled "Cycle Stop," is a pushbutton switch which, when actuated during the filtering system's automatic mode of operation, causes all filtering system components to cease operation.

Control switch 250G, labeled "Cycle Start," is a pushbutton switch which is actuated to key the PLC and thereby initiate the filtering system's automatic mode of operation. It should be noted that, as with control switch 250F, actuation of control switch 250G is effective only when control switch 250D is set in its automatic mode of operation position. To assist visual identification, control switch 250F preferably is colored red and control switch 250G preferably is colored green.

Control switch 250H, labeled "Emergency Stop," is a pushbutton switch which, when actuated, causes power to be cut to the control panel 20. This cut in power causes the inverters, and therefore the pumps, to cease operation. Of course, it will be appreciated that the ordering, and even the function, of these above-described control switches 250 may vary as a matter of design choice.

Figure 10:
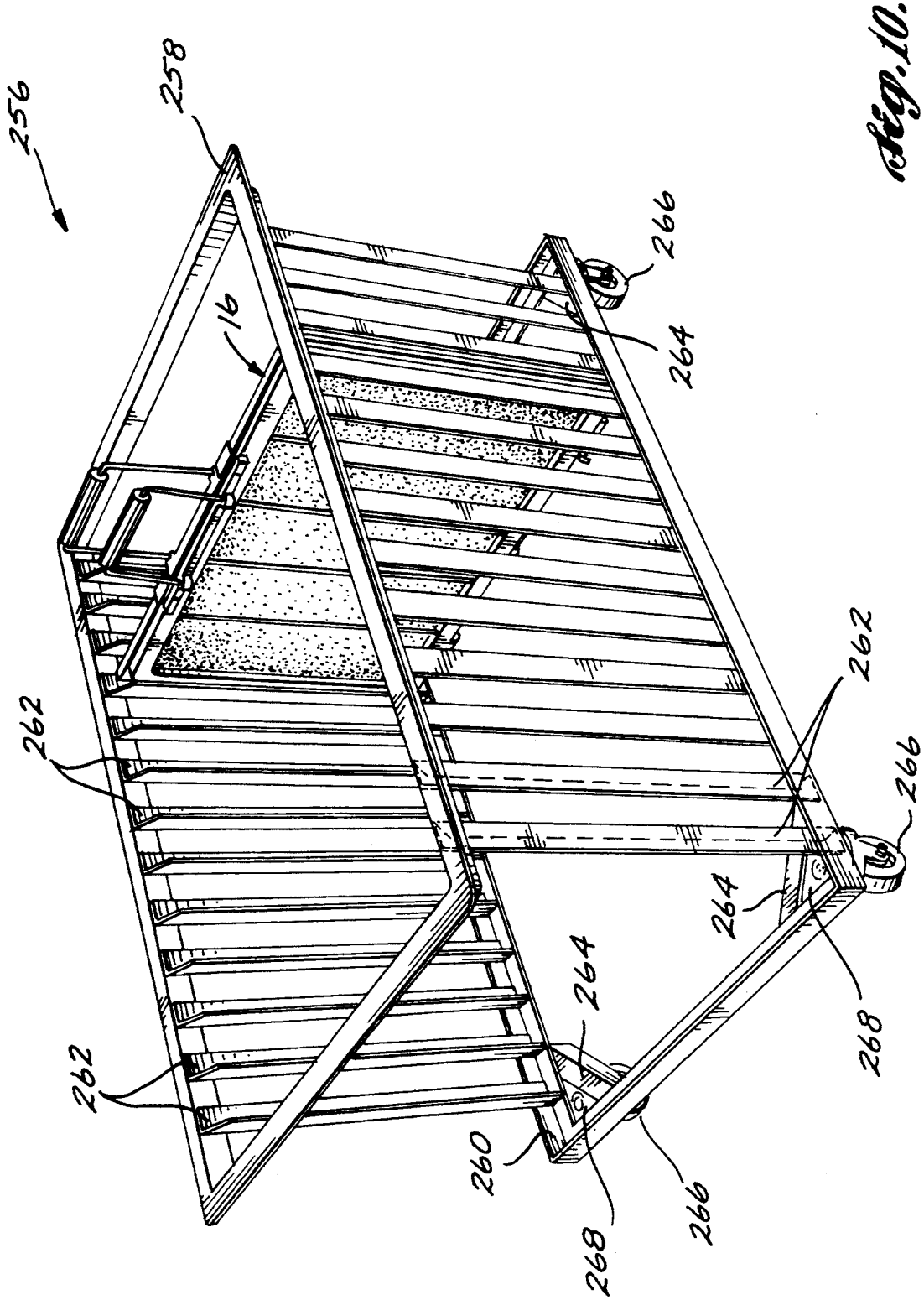
FIG. 10 is a perspective view of a filter cassette support cart, with filter cassette in place, used in conjunction with the filtering system shown in FIG. 1.

The filtering system 10 of the present invention also may include a filter cassette cart 256 (see FIG. 10). The filter cassette cart includes a horizontally oriented rectangular upper frame 258 of double-flange design, one flange extending vertically downward and the other flange extending horizontally outward from the junction of the two flanges. The filter cassette cart also includes a horizontally oriented rectangular lower frame 260 of double-flange design, one flange extending vertically upward and the other flange extending horizontally inward from the junction of the two flanges. The perimeters of upper frame 258 and lower frame 260 are sized so that the downwardly extending flange of the upper frame and the upwardly extending flange of the lower frame are coplanar.

Thirteen vertically oriented supports 262 of double-flange design are mounted to, and extend between, upper frame 258 and lower frame 260 at opposing spaced locations along the frame sides of greater dimension. The mounting flange of each support 262 is mounted by conventional methods to the vertically oriented flanges of the upper and lower frames, while the supporting flange of each support 262 extends orthogonally inward from the junction of the mounting and supporting flanges of the support. All supports 262 mounted to one side of filter cassette cart 256 have their mounting flanges oriented in the same direction, while the supports on the opposite side of the cart have their mounting flanges oriented in the opposite direction. This design provides a rectangular channel, defined by the supporting flanges of opposing supports 262, that is sized to receive a filter cassette 16. Thus, when a filter cassette 16 is inserted, its weight is borne by the horizontally oriented flange of lower frame 260. The filter cassette also is supported on each side by the inwardly projecting supporting flange of a support 262 to reduce side-to-side movement of the inserted cassette. While a filter cassette cart capable of holding thirteen filter cassettes has been illustrated, it will be appreciated that providing a cart capable of holding a greater or smaller number of cassettes requires only minor design changes.

Four diagonal braces 264 are mounted in each corner of lower frame 260 to maintain the structural integrity of the lower frame. A roller 266, pivotally attached to lower frame 260 and to brace 264 through a mounting plate 268, is disposed in each corner to provide for easy movement of the filter cassette cart.

OPERATION

The startup procedure begins with loading fresh filter cassettes 16 (i.e., cassettes having new filter pads) into a clean filter tank 14. Mode control switch 250D is set to its automatic mode of operation position and then Cycle Start control switch 250G is pushed to activate the PLC. The PLC, through its program, activates inverter 244 controlling supply pump 12 to fill the filter tank with contaminated cooking oil. The PLC also initiates a built-in timer circuit controlling inverter 246, which in turn controls suction pump 18. When the pre-programmed time has been reached, three-way valve 116 is properly oriented and suction pump 18 begins to draw contaminated cooking oil under vacuum from the interior of filter tank 14 through filter cassettes 16. The filtered cooking oil then passes into the inlet side of the suction pump via manifold 100, and exits the discharge side of the suction pump under positive pressure to be returned to the supply source via return line 134.

Simultaneous with the initiation of the suction pump timer circuit, the PLC also initiates a built-in relaxation cycle timer circuit and a built-in backflush cycle timer circuit. The relaxation and backflush cycles are described below.

Once filter tank 14 has been filled, and both supply pump 12 and suction pump 18 are running, "normal automatic operation" has begun. The speed, and resultant flow rate, of the pumps corresponds to one of the four preset settings for inverter 246, the speed being selected using Capacity control switch 250E. During normal automatic operation, the desired level of cooking oil 270 within the filter tank is at or near the top of the filter cassette 16, said top being defined by the uppermost portions of sealing frame 156 and housing 152 of the filter cassette (see FIG. 4). The level should never be so low as to expose the filter pad 164 to atmosphere, otherwise suction is broken. As described above, level control mechanism 148 monitors the level of cooking oil within filter tank 14 and transmits this monitored reading to a controller housed within control panel 20. The controller, acting through inverter 244, modulates the speed of supply pump 12 to maintain the desired level of cooking oil within the filter tank.

As normal automatic operation proceeds, contaminants begin to accumulate, or plate out, on the entrance side 166 of filter pad 164. As the accumulation increases, the number of surface sites available for filtering is diminished and resistance to flow through the filter pad is increased, thereby decreasing the degree of effective filtering that may be accomplished by the filtering system. Accordingly, the automatic mode of operation of the filtering system 10 includes a backflush cycle designed to dislodge the contaminant cake that has built up on the entrance side of the filter pad.

As stated above, a timer circuit within the PLC periodically initiates the backflush cycle. At the pre-programmed time, the PLC shuts off both the supply pump 12 and the suction pump 18. There is a pause of sufficient time to allow both pumps to spin down to zero cycles (or revolutions) per second. Suction pump 18 is then started up in reverse for one or more short pulses of reverse flow. As the oil flows upwardly from the manifold 100 through risers 102, then into each filter cassette 16 through male coupling 206, and lastly out through the entrance side 166 of filter pad 164, the cake of built-up contaminants is dislodged from this surface of the filter pad. Filter pad support rods 182 ensure that the filter pad 164 is not blown out through the inlet opening 172 of sealing frame 156 during the periods of reverse flow.

The frequency of administration and the number of reverse pulses is program variable, as is the period of time between pulses. While each of these parameters may vary as a function of the fluid being filtered, it has been found that the administration of one to five reverse pulses, with up to five seconds between each pulse, every two hours has been found advantageous in most cooking oil filtering applications.

After the reverse pulses have been administered, the PLC then reorients three-way valve 116 and starts suction pump 18 in the forward direction to allow the suction pump to draw oil from the bottom of the filter tank 14 through drain aperture 98, then into the inlet side of the suction pump via principal drain line 122 and inlet line 132, and finally out the discharge side of the suction pump into return line 134. This direction of flow is provided by the filtering system 10 for a short period of time to assist the dislodged particles in migrating to the bottom of the filter tank, so that they do not replate to the inlet face of the filter pad when normal forward flow recommences. As the oil is drawn from the bottom of the filter tank through drain aperture 98, the dislodged particles then plate out on wire cloth 90 of sump screen 88.

The desired duration of flow through the bottom of the filter tank may vary with the fluid being filtered. However, it has been found that thirty to sixty seconds of such flow is sufficient in most cooking oil filtering applications. Because this period of flow through the bottom of the filter tank is controlled by the PLC, it is also program variable. At the conclusion of this bottom flow period, three-way valve 116 is again reoriented to allow the cooking oil to exit the filter tank through the filter cassettes 16 and risers 102 (i.e., normal forward flow in the normal automatic operating mode).

Figure 11A:
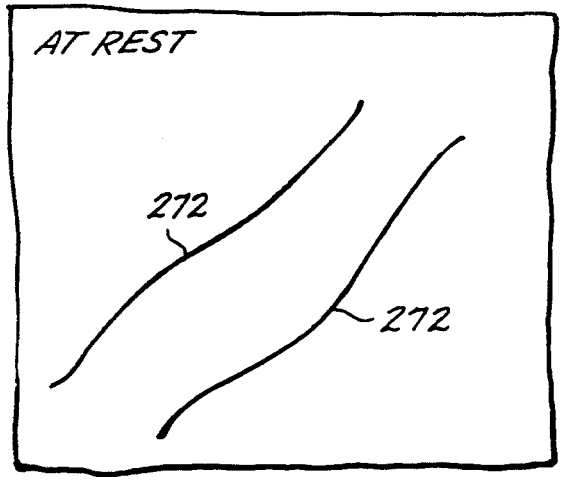
FIGS. 11A and 11B are schematic views showing the interstitial area between adjacent fibers of the filter pad when at rest and when a vacuum is applied, respectively.
Figure 11B:
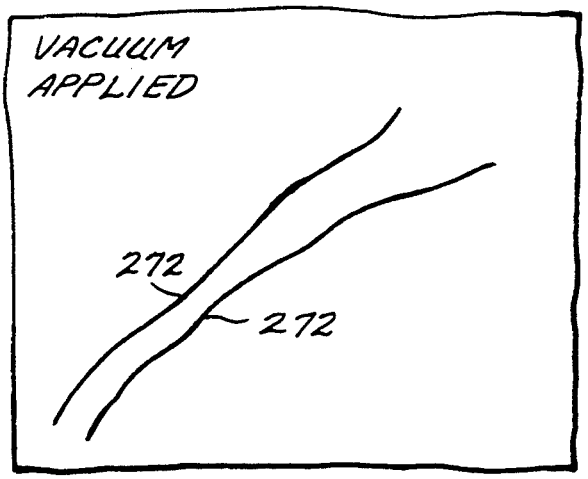
Figure 12A:
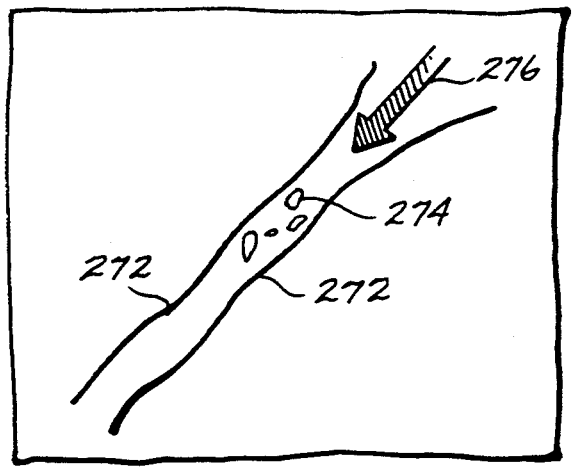
FIGS. 12A, 12B, and 12C are schematic views showing the accumulation of contaminants within, and the resultant reduction in fluid flow through, the interstitial area shown in FIG. 11B.
Figure 12B:
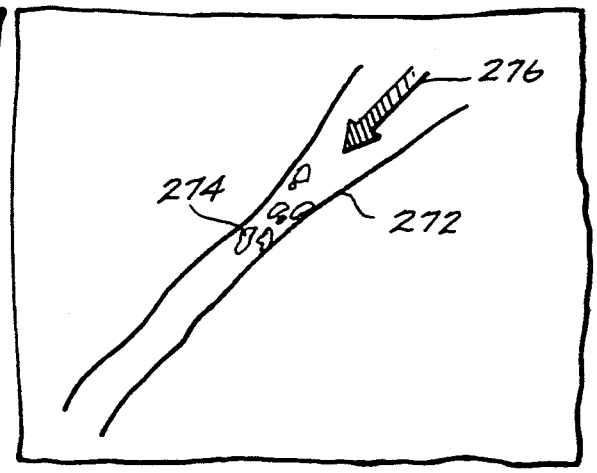
Figure 12C:
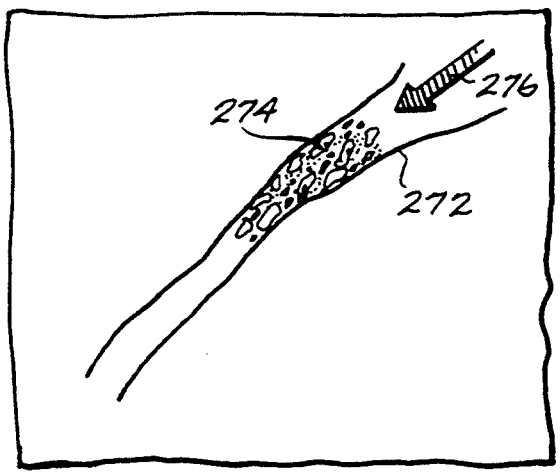

Because the filter pad 164 is formed of a cellulose fiber matrix having a substantial thickness dimension and a mean pore size gradient, contaminants accumulate along the entire depth of the filter pad. Generally, larger contaminants are removed nearer the entrance side of the filter pad, whereas smaller contaminants are removed nearer the exit side of the filter pad. As the deforming vacuum force is applied to filter pad 164, the interstitial space between adjacent fibers 272 of the matrix is decreased (see FIGS. 11A and 11B). Referring to FIGS. 12A, 12B, and 12C, it is illustrated that, as the number of accumulated contaminants 274 increases, the flow of oil 276 through the interstitial space between the fibers 272 is diminished. Accordingly, the automatic mode of operation of the filtering system 10 includes a relaxation cycle designed to remove these pocket accumulations of contaminants. The net result is that the filter pad is rejuvenated with each relaxation cycle, and the pad's internal loading capacity is thereby increased.

Figure 13A:
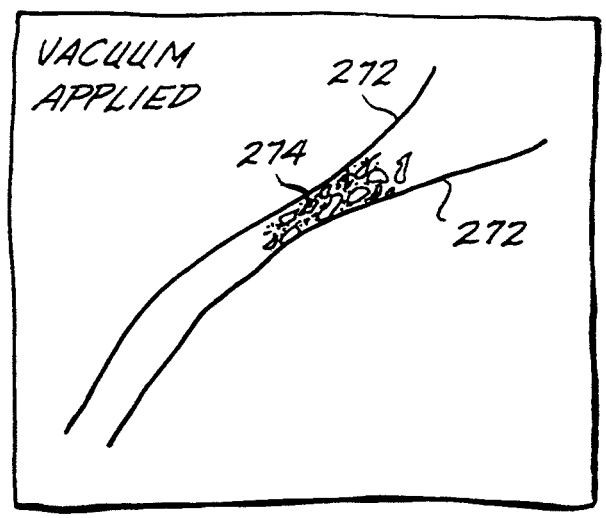
FIGS. 13A, 13B, and 13C are schematic views showing the dislodging of accumulated contaminants accomplished during the relaxation cycle associated with operation of the filtering system of the present invention.
Figure 13B:
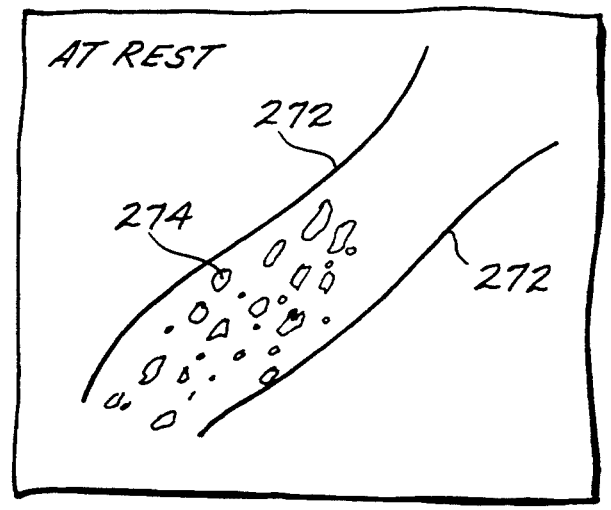
Figure 13C:
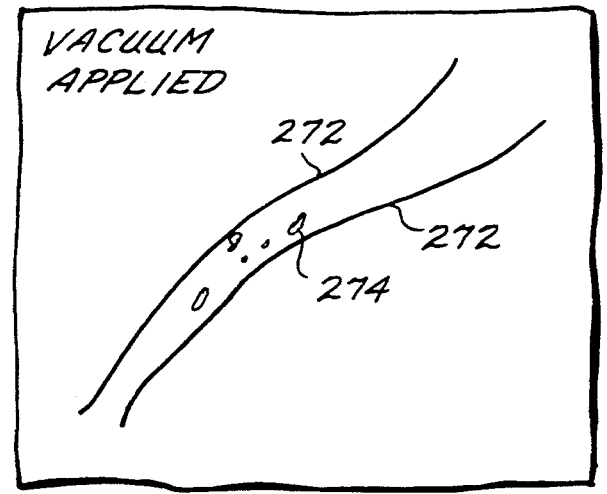

As described above, a timer circuit within the PLC initiates the relaxation cycle. At the pre-programmed time, the PLC causes the vacuum applied by suction pump 18 to be interrupted for a pause period and then reapplied for a resumption period. This pause period of no flow followed by a resumption period of normal forward flow may be repeated until sufficient internal dislodging of contaminant pockets has occurred within the filter pad. This dislodging of contaminants is best understood by reference to FIGS. 13A, 13B, and 13C.

The frequency of administration, the number of iterations, the duration of the pause period, and the duration of the resumption period are program variable. While these parameters may vary with each filtering application, it has been found that the administration of three iterations of a ten second pause period followed by a ten second resumption period every fifteen minutes is advantageous in most cooking oil filtering applications. After the desired relaxation cycle iterations have been performed, the PLC then returns the filtering system 10 to normal automatic operation.

While the backflush and relaxation cycles significantly increase the useful life of the filter pad 164, at some point the filter pad will nevertheless reach a state beyond which it is not advisable to continue filtering operations. When the filter pad reaches this state of contaminant buildup, the filter pad should be replaced. While the contaminant loading of the filter pad will vary with each area of application, a period of eight to twelve hours between filter pad replacements is reasonable in most cooking oil filtering applications.

Replacement of one or more filter pads 164 may be performed while the filtering system 10 continues to operate, thereby resulting in no process down time. Control valve 108 for the associated filter cassette 16 housing the pad is closed and the filter cassette removed from the filter tank 14. The contaminated filter pad is removed, the filter cassette cleaned, and a fresh filter pad installed. The cassette housing the fresh filter pad may then be reinserted into the filter tank and the control valve returned to its open (filtering) position.

Replacement of filter pads 164 also may be performed wherein the operation of filtering system 10 is ceased. To replace the filter pads under this scenario, the filtering system operator will either depress Cycle Stop control switch 250F or turn the selector of Mode control switch 250D to its manual mode of operation position. Either action shuts down the automatic mode of operation for the filtering system 10, thereby leaving a filter tank 14 full of oil. Drain control switch 250C and Pump Out control switch 250B are then simultaneously depressed. While depressed, control switch 250B causes suction pump 18 to draw cooking oil from the filter tank, and control switch 250C reorients three-way valve 116 so that the cooking oil is drawn from the filter tank through drain aperture 98 and fed to the inlet side of suction pump 18 through principal drain line 122 and inlet line 132. The simultaneous depression of control switches 250B and 250C is continued until all cooking oil is drained from the filter tank. It will be appreciated that, alternatively, control switch 250C may be designed to reorient the three-way valve with a single depression, rather than continuous depression.

Once this pump-down process is complete, the cleanup process is preformed. Filter cassettes 16 are extracted from the filter tank, placed in filter cassette cart 256, and transported to a location where the contaminated filter pads may be removed, the filter cassettes cleaned, and fresh filter pads installed. Splash screen 48 and sump screen 88 may also be removed and transported to a location where they can be cleaned. Preferably, the filtering system 10 is located near a hose (with or without spray jet) carrying a supply of high-pressure water. If so, all surfaces within the filter tank may be sprayed down, and therefore cleaned, with the high-pressure water. The water introduced into the interior of filter tank 14, and the contaminants dislodged thereby, may be removed from the bottom of the filter tank through drain aperture 98 and then collected within a receptacle (e.g., bucket, etc.) after passing via gravity through secondary drain line 124 and out spigot 126. If a source of high-pressure water is present, it will be appreciated that splash screen 48 and sump screen 88 need not be transported for cleaning, but may be cleaned within the interior of the filter tank. While not normally utilized, Pump In control switch 250A may be actuated if it is desirable to add oil to the filter tank to facilitate the cleanup process.

As the above-described filter pad change-out point approaches, an oil shearing phenomena may develop. This phenomena is best understood through the use of an example. During the initial stages of normal automatic operation, with the filter cassettes 16 initially containing fresh filter pads 164, suppose that suction pump 18 operates at sixty cycles per second to draw one hundred gallons per minute through the filter cassettes. As described above, the level control mechanism 148 controls the volumetric flow rate of supply pump 12 so as to maintain an essentially constant level of cooking oil within filter tank 14. Ignoring minor deviations, this means that supply pump 12 also is operating at sixty cycles per second (assuming the pumps have the same rating) and one hundred gallons per minute during initial filtering operations.

Despite the backflush and relaxation cycles, the filter pads nevertheless become saturated with contaminants, and resistance to flow through the filter pad is greatly increased. Consequently, suction pump 18 might be able to draw only seventy gallons per minute while operating at sixty cycles per second during this loaded condition. The result is that the suction pump is operating at a frequency too high for the volumetric flow that is being drawn. This causes the cooking oil passing through suction pump 18 to be exposed to undesirable churning, or shearing, which leads to the breakdown of desirable macro molecules contained within the cooking oil. Loss of these macro molecules yields a cooking oil having inferior cooking qualities when returned to the supply source.

To combat this shearing phenomenon, the analog device housed within control panel 20 monitors the volumetric output of supply pump 12 and, when a sufficient drop in flow rate has occurred, the operating frequency of the suction pump is reduced in a manner described in the paragraph below. Using the example described above, when the flow rate of supply pump 12 has dropped to perhaps seventy-five gallons per minute, the operating frequency of suction pump 18 may be reduced from sixty cycles per second to perhaps forty-five cycles per second. Despite this drop in operating frequency, it is still possible for the suction pump to discharge nearly seventy-five gallons per minute. However, the more important aspect of this reduced operating frequency is that the shearing phenomenon is eliminated.

The analog device housed within control panel 20 continuously monitors inverter 244 and, therefore, the flow rate of supply pump 12. When the analog device senses that the flow rate of supply pump has fallen below a preset trigger point, a signal is sent to the PLC. A timer circuit within the PLC is initiated and, if the supply pump flow rate is still below the trigger point at the end of the timer circuit period (e.g., fifteen minutes), the PLC reduces the operating frequency of suction pump 18. The timer circuit ensures that the sensed low-flow condition is not simply an aberration. The trigger point is preferably set at sixty to eighty percent of the initial flow rate of supply pump 12 (i.e., the pump's flow rate when normal automatic filtering operation begins). More preferably, the trigger point is set at seventy to seventy-five percent of this value.

If the filtering system 10 of the present invention services more than one supply source (e.g., fryer, etc.), a supply manifold (not shown) may be utilized to draw an equal amount of cooking oil to be filtered from each of the supply sources. Consequently, a return manifold (not shown) must also be utilized to evenly distribute the filtered cooking oil to the multiple supply sources. To minimize the amount of piping required, the supply and return manifolds are preferably located adjacent the multiple supply sources. Additionally, an equalizer manifold (not shown) may be used in conjunction with either the supply manifold, the return manifold, or both to compensate for differences in line friction.

A prescreening, or crumb removal, station may be positioned either upstream of the supply pump 12, or between the supply pump and the filter tank 14. However, it is preferable that such a station be located upstream of the supply pump so as not to expose the supply pump to the larger contaminants (i.e., gross crumbs and sediments). Existing absolute filtering systems of the type described in the Background of the Invention section (e.g., paper, wire cloth, etc.) may be utilized to perform the crumb removal step. Removal of the larger contaminants in this manner will extend the loading life of the filter pad, particularly the external loading life of the pad, due to the reduction in the level of contaminant build-up at the inlet face of the pad.

DOUBLE-DENSITY SYSTEM

Figure 14:
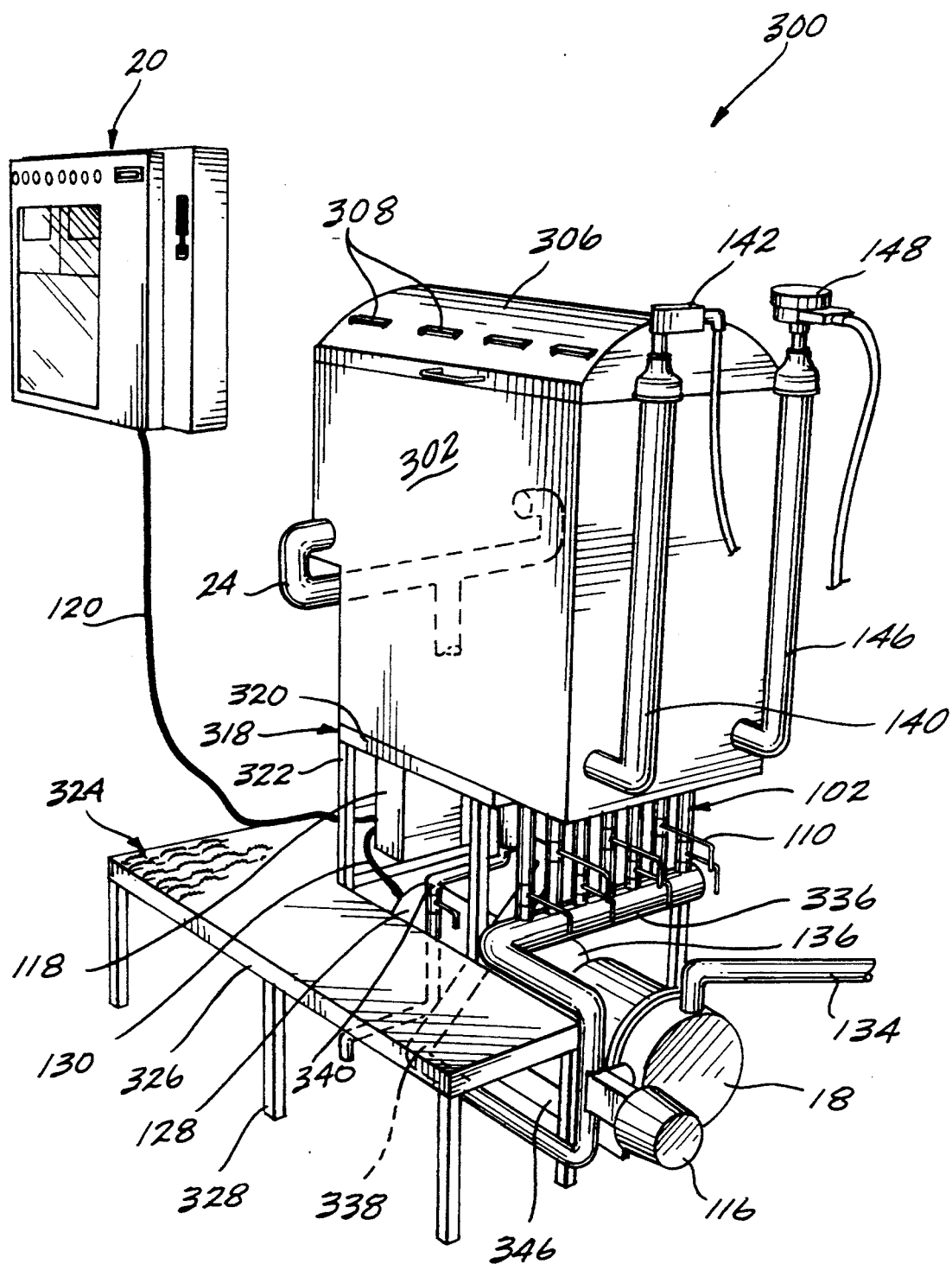
FIG. 14 is an environmental perspective view of a second embodiment—namely, a double-density filtering system made in accordance with the principles of the present invention.
Figure 15:
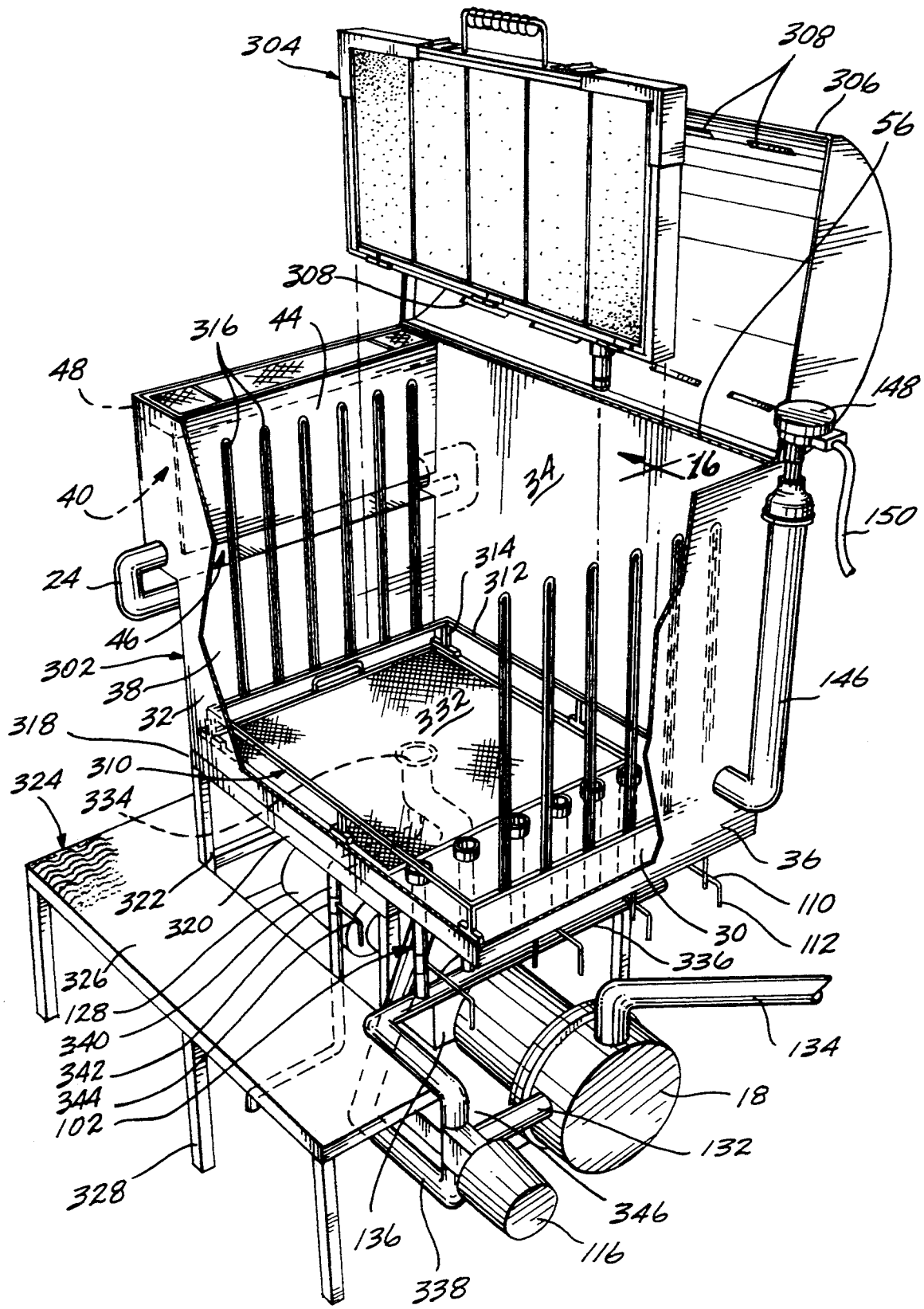
FIG. 15 is a perspective view of the filter tank and surrounding components of the double-density filtering system shown in FIG. 14, said view showing the cover to the filter tank in an open position, a double-density filter cassette exploded from its position of application, and cuts taken through the walls of the tank to better illustrate internally disposed components.
Figure 16:
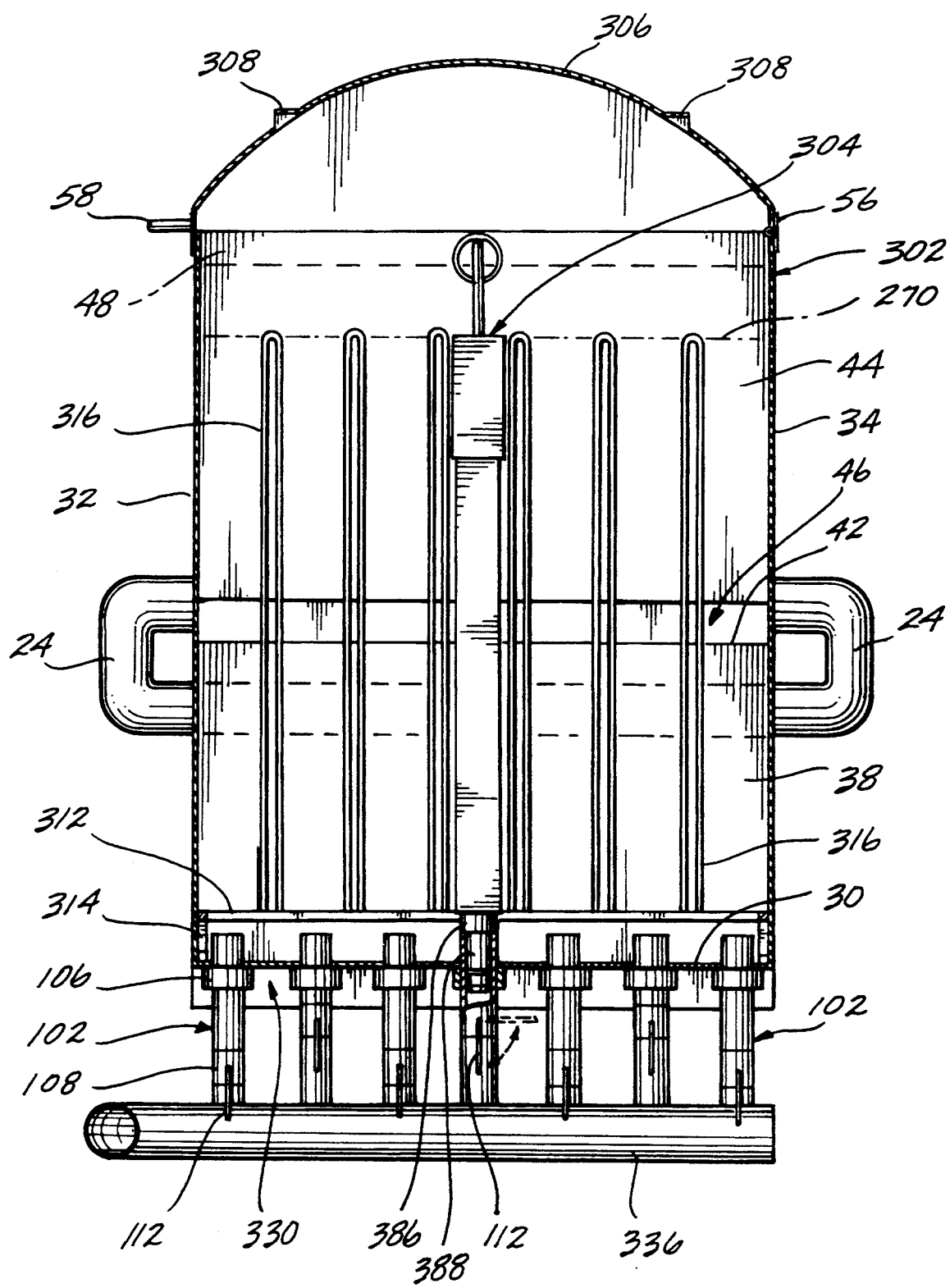
FIG. 16 is a partial cross-sectional side view of the filter tank, showing a double-density filter cassette in place, taken along line 16—16 of FIG. 15.

A double-density filtering system 300 formed in accordance with the present invention is illustrated in FIGS. 14, 15, and 16. This filtering system is structurally and operationally similar to the filtering system 10 described above. Accordingly, like components will bear like reference numerals. Of course, it will be appreciated that minor dimensional differences may exist between like-numbered components of the two filtering systems. Thus, in the paragraphs that follow, only the structural and operational differences between the two systems will be described.

Double-density filtering system 300 generally includes a supply pump 12 (not shown), a filter tank 302 having a plurality of double-density filter cassettes 304 disposable therein, a suction pump 18, and a control panel 20. As with filtering system 10, monitoring and control of the double-density filtering system 300 is primarily accomplished by components housed within control panel 20.

Referring to FIGS. 15 and 16, it is illustrated that filter tank 302 has approximately half the central volume of above-described filter tank 14. Because double-density filter cassettes 304 are oriented ninety degrees from the orientation of filter cassettes 16 in filtering system 10, the distance from right end wall 36 to left end wall 38 must slightly exceed the longer dimension of a double-density filter cassette. The distance from front sidewall 32 to back sidewall 34 is such that seven double-density filtering cassettes 304 may be accommodated in a supported position.

A domed cover 306, hingedly coupled to the upper portion of back sidewall 34 through a piano hinge 56, encloses filter tank 302. Domed cover 306 has an upper arched portion and a lower rectangular portion sized to snugly enclose the uppermost periphery of filter tank 302. A plurality of vents 308 are formed in the upper arched portion of domed cover 306 along each side of the apex of the cover.

During the filtering process, volatiles exist at the upper surface of the hot cooking oil within filter tank 302. These volatiles include steam and oil degradation compounds. In the absence of venting, these volatiles will be gassed off and begin to accumulate in the form of a residue along the inside surface of domed cover 306.

Over time, heavily concentrated residue will then drip back into the cooking oil—a process which has a detrimental effect on the health of the oil. However, providing vents 308 in domed cover 306 allows volatiles to be removed from double-density filtering system 300, thereby eliminating the concentrated residue drip-back problem. Of course, it will be appreciated that vents may also be provided in cover 54 of filtering system 10 to obtain the same beneficial effect.

A filter cassette rack 310 is disposed within filter tank 302 atop bottom surface 30. Filter cassette rack 310 includes a horizontally disposed rectangular support frame 312, which is supported above bottom surface 30 by three supports 3 14 evenly spaced along each of the longer sides of the support frame. Six inverted U-shaped guides 316 extend upwardly from support frame 312 along its shorter sides (i.e., the sides adjacent right end wall 36 and left end wall 38). The spacing between guides 316 is such that seven double-density filter cassettes 304 may be accommodated within filter tank 302. Guides 316 adjacent right end wall 36 are aligned with those adjacent left end wall 38, such that guide channels are formed to provide a path of insertion and extraction for the double-density filter cassettes.

While the illustrated guide configuration theoretically may prevent side-to-side movement of the double-density filter cassettes 304, no such movement actually occurs once the cassettes are properly inserted and seated within the filter tank. It will be appreciated that the height of guides 316 may be shortened so that the cassettes need not be lifted as high in order to be inserted or removed. This reduction in lift height is actually more advantageous upon removal, when the filter pads have become saturated and thereby heavier.

Referring now to FIGS. 14, 15, and 16, a tank frame 3 18 supports filter tank 302 in an elevated position. Tank frame 318 includes a horizontally oriented rectangular tank support 320 having a support leg 322 extending downwardly from each of its four corners. As illustrated, a portion of filter tank 302 extends beyond the outer perimeter of tank support 320 at the end of the filter tank nearest right end wall 36. While it will be appreciated that this overhang is somewhat counterbalanced by the volume of intake compartment 40, the degree of overhang should not be so great as to result in a filter tank 302 that is unbalanced atop tank frame 318. While not illustrated, horizontally disposed cross members may extend between the support legs 322 to provide increased stability.

To allow operator access to the interior of filter tank 302, an L-shaped access step 324 is provided along the front and left side of the filter tank. Access step 324 includes a horizontally oriented platform 326 supported in an elevated position by a plurality of downwardly extending support legs 328. Platform 326 is of grip-strut, or perforated, design and is attached by conventional methods to tank frame 318. The grip-strut design provides added safety, as it is not desirable to have operators standing on a flat, smooth, greasy surface. Because less oil is retained along the upper surface of platform 326 with such a design, the cleanup process is also made easier.

A rectangular lower recessed area, or sump 330, is formed in the bottom surface 30 of filter tank 302 (see FIGS. 15 and 16). Sump 330 extends in one direction from front sidewall 32 to back sidewall 34. In the other direction, it extends from left end wall 38 toward right end wall 36, but terminates well short of the right end wall. A sump screen 332, similar in design and function to sump screen 88 of filtering system 10, is disposed within sump 330. A centrally located drain aperture 334 is formed in the bottom surface of sump 330.

A hollow cylindrical manifold 336 is horizontally disposed beneath the bottom surface 30 of filter tank 302 at a position parallel to, and between, sump 330 and right end wall 36 of the filter tank. The end of manifold 336 proximate back sidewall 34 is closed. The opposite open end of manifold 336 terminates, after making two ninety degree bends, at a three-way valve 116 disposed outward of the tank frame 318 (see FIG. 15).

Seven hollow cylindrical risers 102 extend upwardly from manifold 336 through bottom surface 30 of filter tank 302 to terminate at a location slightly above the bottom surface. It should be noted that because risers 102 are positioned adjacent right end wall 36, rather than adjacent front sidewall 32 (as in filtering system 10), they are situated away from the foot area of the operator. Accordingly, no actuator plate need be employed. Preferably, risers 102 of double-density filtering system 300 are spaced the same distance as are the risers of filtering system 10. As will be described below in conjunction with FIG. 19, this allows double-density filter cassettes 304 to be employed in filtering system 10.

A principal drain line 338 disposed below the bottom surface 30 of filter tank 302 has an open end connected with drain aperture 334. Principal drain line 338 has a number of ninety degree elbows formed therein such that the drain line extends vertically downward from the point of connection with drain aperture 334, then horizontally outward toward right end wall 36, then at a downward angle to a position just above the environmental surface, then horizontally outward, and finally vertically upward such that its opposite open end terminates at three-way valve 116 (see FIG. 15).

A secondary drain line 340, of smaller diameter, is connected to principal drain line 338 at the first ninety degree elbow downstream from the point of connection between the principal drain line and drain aperture 334. As shown in FIG. 15, secondary drain line 340 extends vertically downward from its point of connection, and then consists of alternating horizontal and vertical sections that terminate beneath access step 324 in a downwardly projecting open discharge end. A valve 342, having an actuator 344 coupled thereto, is disposed in the middle vertical section of secondary drain line 340.

The variable-speed, reversible suction pump 18, gearbox 136, and motor 128 of double-density filtering system 300 are secured to the upper surface of a platform 346 (see FIGS. 14 and 15). However, unlike the platform 138 of filtering system 10, platform 346 is of self-contained design and need not be secured to tank frame 318. The emergency shutoff mechanism 142 and level control mechanism 148 of double-density filtering system 300 are structurally and operationally equivalent to those used in filtering system 10.

FIGS. 17 and 18 illustrate that double-density filter cassette 304 generally includes a housing 348 having a fixed handle 350, a pair of sealing frames 352 coupled to the housing by spaced hinges 354, and a pair of spaced latches 356 pivotally mounted to housing 348 and designed to engage the housing and sealing frames to hold the double-density filter cassette in its closed operative position (shown in FIG. 18). A pair of filter pads 164, identical to the filter pads utilized in filter cassette 16 of filtering system 10, are adapted to be contained within recesses formed in housing 348.

Each sealing frame 352 is a thin, substantially rectangular plate having a large, centrally located inlet opening 358 through which the contaminated cooking oil enters. Unlike sealing frame 156 of filtering system 10, sealing frame 352 possesses no orthogonally projecting ribs. Rather, the width of sealing frame 352 is approximately half the width of sealing frame 156. It has been found that this reduced width provides sufficient peripheral pressure to seal, thereby eliminating the need for ribs. One definite advantage of this configuration is that more surface area of filter pad 164 is made available for filtration. For example, with a filter pad measuring 18×24 inches, the increase in available filtering surface area is approximately ten percent.

Sealing frame 352 has a peripheral configuration and dimension substantially matching that of filter pad 164. Accordingly, sealing frame 352 has one notched corner corresponding to the seating cut-out 170 of the filter pad. When double-density filter cassette 304 is in its closed operative position, and the pair of filter pads 164 are in place, each sealing frame forms a peripheral line of seal which ensures that the contaminated cooking oil passes through, rather than around, the filter pads. Four spaced filter pad support rods 360 extend from the side of sealing frame 352 possessing hinges 354 to the opposite side of the sealing frame (i.e., across the shorter dimension of inlet opening 358).

When oriented as shown in FIG. 18, housing 348 has a flat, vertically oriented peripheral surface 362; a flat, inwardly projecting, horizontally oriented upper surface 364 contiguous with peripheral surface 362; a flat, downwardly projecting middle edge 366 contiguous with upper surface 364; a flat, inwardly projecting, horizontally oriented middle surface 368 contiguous with middle edge 366; a flat, downwardly projecting inner edge 370 contiguous with middle surface 368; and a flat, inwardly projecting, horizontally oriented inner surface 372 contiguous with inner edge 370. Of course, FIG. 15 clearly illustrates that double-density filter cassette 304 is actually oriented some ninety degrees from the orientation shown in FIG. 18 when the cassette is placed in its operational position within filter tank 302. The inner peripheral dimension of the middle edge 366 of housing 348 only slightly exceeds the outer peripheral dimension of sealing frame 352, so that a relatively snug fit exists between the housing and sealing frame when the double-density filter cassette 304 is in its closed operative position. However, the fit is not so snug as to interfere with the operation of the hinges 354.

As shown in FIG. 18, the middle edge 366 and middle surface 368 of housing 348 define a recess 374 sized to receive filter pad 164 and sealing frame 352. The outwardly lying side of middle surface 368 provides a seating surface 376 against which the periphery of the filter pad is positioned. Middle surface 368, and therefore seating surface 376, have a peripheral configuration and dimension substantially matching, but slightly greater than, that of filter pad 164. Accordingly, seating surface 376 has one notched corner corresponding to the seating cut-out 170 of the filter pad (see FIG. 17). This notched corner configuration is defined by a solid corner 378 which extends downwardly from upper surface 364 of housing 348 the same distance as does middle edge 366. It is this configuration of seating surface 376 and solid corner 378 that provides proper filter pad orientation by ensuring that only exit side 168 of filter pad 164 may rest against the seating surface. In short, the filter pad fits only one way. When double-density filter cassette 304 is in its closed operative position, the pair of filter pads 164 are gripped between the seating surfaces 376 and the sealing frames 352 to provide a substantially fluid-tight seal about the periphery of each filter pad.

A pair of filter pad support screens 380 are peripherally mounted in spaced orientation within recesses 382, which are defined by the inner edges 370 and inner surfaces 372 of housing 348 (see FIGS. 17 and 18). Preferably, each filter pad support screen is welded into place at positions along inner surface 372. Filter pad support screen 380 is an expanded metal matrix, with each matrix member having a substantially parallelogram-shaped cross section. Thus, filter pad support screen 380 provides a support surface for filter pad 164 in the central region of housing 348, while at the same time contacting only a minuscule portion of the surface area on the exit side 168 of the filter pad. Given this minimal area of contact, virtually no impedance to the free flow of contaminated oil through the filter pad is attributable to filter pad support screen 380.

Several cylindrical posts 383, disposed at evenly spaced locations, extend between filter pad support screens 380 to prevent the screens from deforming inwardly during filtering operations. It has been found that three rows of $\frac{3}{8}$-inch diameter stainless steel posts, with three posts in each row, is sufficient.

An outlet aperture 384, through which the filtered cooking oil exits, is formed in the peripheral surface 362 of housing 348 (see FIG. 18). Viewing housing 348 in the open position illustrated in FIG. 17, outlet aperture 384 is formed in peripheral surface 362 at a position adjacent and slightly inward of right outer hinge 354. An internally threaded, hollow cylindrical mount 386, sized to receive the threaded end of a hollow cylindrical male coupling 388, is attached to housing 348 such that it surrounds outlet aperture 384. Near the end of male coupling 388 distal from its end of threaded attachment, a circular recess sized to receive a resilient O-ring 390 is formed. As shown in FIG. 16, the male coupling 388, with resilient O-ring 390 in place, is received within the upper terminal end of riser 102 in slip coupling fashion to provide a sealed connection between double-density filter cassette 304 and the riser. In this way, the vacuum applied by suction pump 18 draws contaminated cooking oil through the pair of filter pads 164 and delivers filtered cooking oil into manifold 336 through riser 102 (when control valve 108 is in its open position).

Three spaced-apart hinges 354 hingedly couple each sealing frame 352 to the housing 348. When the sealing frames are pivoted to the closed operative position shown in FIG. 18, and a pair of filter pads 164 is in place, it will be appreciated that a large centrally located chamber 392 is formed within housing 348. As will be described below, the chamber design has the benefit of reducing fluid turbidity, thereby improving the filtering performance of double-density filter cassette 304.

Each hinge 354 has a gudgeon 394 mounted to the peripheral surface 362 of housing 348 by conventional methods. For the two outer hinges, a gudgeon 396 mounted to sealing frame 352 by conventional methods is configured to be disposed immediately adjacent, outside of, and axially aligned with gudgeon 394. For the center hinge, a center gudgeon 396 mounted to sealing frame 352 is disposed immediately adjacent and axially aligned with center gudgeon 394, but may be disposed on either side of the center gudgeon 394. Gudgeons 394 and 396 have central bores that are axially aligned and sized to receive a pin 398 which permits rotation of the gudgeons around the pin, thereby providing a hinged coupling of the sealing frames 352 to the housing 348. Pin 398 is removable from the central bores to provide easy and effective cleaning of the filter cassette components.

Handle 350 extends orthogonally outward from a centrally located position along the peripheral surface 362 of housing 348 at a location opposite hinges 354 (see FIG. 17). Handle 350 includes a U-shaped rod 400, which has a cylindrical wire-wound handgrip 402 mounted to its middle section (i.e., the section distal from housing 348). Double-density filtering system 300 is designed to be employed in a variety of environments, some of which operate at temperatures in excess of 400° F. It has been found that the wire-wound handgrip 402 is preferable to the handgrips used in handles 154 and 160 of filter cassette 16, given its ability to more easily dissipate heat. At higher operating temperatures, gloves must be worn by the operator handling the filter cassettes. However, even with the use of gloves, the operator's effective handling time is limited. Thus, wire-wound handgrip 402 has the advantage of increasing this effective handling time.

Each latch 356 includes an engagement bracket 404 pivotably mounted through a hinge 406 to the peripheral surface 362 of housing 348 at a location outward of, and adjacent to, handle 350 (see FIG. 17). Engagement bracket 404 is of ninety degree elbow configuration and has a U-shaped cross section. When double-density filter cassette 304 is in its closed operative position (shown in FIG. 18), the outer edges of engagement bracket 404 engage sealing frames 352 such that the sealing frames compress filter pads 164 to create substantially fluid-tight seals about the periphery of the filter pads.

Unlike filter cassette 16, double-density filter cassette 304 is of a configuration capable of being composed of stainless steel without undue manufacturing concerns. An advantage of such a design is that it eliminates undesirable engagement between stainless steel and aluminum components. Because double-density filter cassette 304 has approximately the same depth dimension as does filter cassette 16, filter cassette cart 256 (see FIG. 10) may also be employed with the double-density filter cassettes.

FIG. 19 illustrates a filter cassette rack 408 designed to be retrofit to filter tank 14, so that filtering system 10 can accommodate double-density filter cassettes 304. Just as with filter cassette rack 310 described above, filter cassette rack 408 includes a horizontally disposed rectangular support frame 410 and three underlying supports 4 12 evenly spaced along each of the longer sides of the support frame. However, thirteen (rather than six) inverted U-shaped guides 414 extend upwardly from support frame 410 along its longer sides. To retrofit filter tank 14 with filter cassette rack 408, guides 60 disposed along back sidewall 34, guides 64 disposed along front sidewall 32, and support bars 62 and 66 must be removed.

Double-density filtering system 300 includes the same control panel 20, and its associated components, as does filtering system 10. Accordingly, operation of double-density filtering system 300 is substantially identical to operation of filtering system 10.

Even though double-density filtering system 300 and filter system 10 are similarly operated, the design of filtering system 300 yields several filtering advantages. As stated above in the Background of the Invention section, the addition of an in-line filtering system to a supply source (fryer, etc.) results in an increase in turnover due to the added volume. Because double-density filtering system 300 has a volume approximately half that of filtering system 10, it yields an increase in turnover that is only half as great.

Referring to FIG. 20, it is shown that a supply source utilizing no filtering system has a turnover of $T_1$ and an oil quality level of $Q_1$. If filtering system 10 is added, turnover is increased to $T_3$, with a corresponding drop in oil quality to $Q_3$. However, if double-density filtering system 300 is added, the resultant turnover $T_2$ is an increase in turnover that is only half as great. More importantly, the reduction in oil quality to a level of $Q_2$ is a reduction in quality that is actually less than half, given the exponential nature of the oil quality curve.

At first blush, it might appear desirable to employ no filtering system at all. However, this completely ignores the beneficial increase in oil quality resulting from the filtering process itself. Referring again to FIG. 20, it is illustrated that for filtering system 10 a recoupment in oil quality of $R_1$ must occur before the beneficial effects of filtration are truly realized. It is also shown that for double-density filtering system 300 a much smaller recoupment in oil quality of $R_2$ must occur before the beneficial effects of filtration are realized. Consequently, this smaller amount of required recoupment is yet another advantage of the double-density filtering system 300.

It also has been found that the chamber design of double-density filter cassette 304 leads to an increased rate of flow. This phenomenon, and its importance, is best understood by examining the total restriction to flow faced by suction pump 18. In short, this total restriction to flow is a combination of: (1) filter pad resistance; (2) filter pad loading; (3) piping friction (line loss); (4) head; and (5) filter cassette void space turbidity (non-laminar flow). Given that items (1), (3), and (4) are fixed for a given filtering system, it will be appreciated that reducing the amount of non-laminar flow, or turbidity, within the filter cassette frees up available pump pressure to overcome flow restriction caused by filter pad loading (which increases over time). A significant benefit of this reduction is that the useful life of the filter pad is extended. An additional benefit is that administration of the above-described shear prevention measure is postponed until later in the pad's life cycle.

With filter cassette 16, much of the energy supplied by suction pump 18 goes to overcome resistance to flow after the oil has passed through the filter pad (i.e., void space turbidity). Referring to FIG. 6, it is illustrated that there is not a great deal of void space within recess 200 on the downstream side of filter pad 164. In marked contrast, the void space within chamber 392 of double-density filter cassette 304 is quite expansive, thereby resulting in a significant reduction in turbidity (see FIG. 18). For filter cassettes designed to accommodate a filter pad measuring 18×24 inches, the following measurements were obtained.

|  | Filter Cassette 16 | Filter Cassette 304 |
| --- | --- | --- |
| Volume (inches$^3$) | 40 | 542 |
| Surface Area (inches$^3$) | 352 | 773 |

-continued

|  | Filter Cassette 16 | Filter Cassette 304 |
|---|---|---|
| Volume/Surface Area Ratio | .114 | .700 |

It should be noted that the above surface area figure for double-density filter cassette 304 represents the available filtering surface area for two filter pads. "Available filtering surface area" corresponds to the uncovered area of the entrance side 166 of filter pad 164 (i.e., the area interior to the sealing frame). "Volume" corresponds to the internal volume of recess 200 in filter cassette 16 (see FIG. 6) and chamber 392 in double-density filter cassette 304 (see FIG. 18). As the above table represents, the volume/surface area ratio for double-density filter cassette 304 is more than six times as great as that for filter cassette 16. It is preferable to have a volume/surface area ratio of at least 0.30 for double-density filter cassette 304. More preferably, this ratio is between 0.50 and 1.00.

As the following Example illustrates, this increased volume/surface area ratio in the design of double-density filter cassette 304 causes a reduction in void space turbidity, which manifests as a drastic increase in oil flow rate during testing. This is precisely the reason it is advantageous to retrofit filter tank 14 of filtering system 10 with filter cassette rack 408 (see FIG. 19).

EXAMPLE

The test apparatus utilized included a Lucks G2424 fryer containing edible cooking oil set to approximately 350° F., a Viking variable-speed vacuum pump (Model No. L125), an Ashcroft vacuum gauge, and a Hedland flow meter. The discharge opening of the filter cassette (i.e., the male coupling) was connected by flexible tubing to the inlet side of the vacuum pump. The vacuum gauge and flow meter were disposed along this tubing at a location slightly upstream of the pump. A second section of flexible tubing was connected to the discharge side of the vacuum pump in order to return oil to the fryer.

Filter cassette 16, containing a new filter pad 164, was then submerged in the fryer and the vacuum pump was initiated. Once a constant flow rate of 10 gpm was established through the filter cassette, powdered clay was then introduced into the fryer. The filter cassette 16 was slightly agitated to provide an even displacement of clay. Clay addition and agitation was continued until 28 inches Hg was noted on the vacuum gauge, at which time the corresponding flow rate was recorded.

Using identical operating parameters, this test was then conducted using double-density filter cassette 304 housing a pair of new filter pads 164. Two more tests were conducted for each of the filter cassettes. The results of the tests are presented in the following table.

| Test No. | Filter Cassettte 16 | Filter Cassette 304 | Improvement |
|---|---|---|---|
| 1 | 2.3 gpm | 5.2 gpm | 126% |
| 2 | 2.1 gpm | 5.0 gpm | 138% |
| 3 | 2.6 gpm | 5.4 gpm | 107% |

It should be noted that the actual observed flow rate during the testing of double-density filter cassette 304 was actually double the value shown in the table. Given that this cassette employs two filter pads, a fair comparison of flow rates demands that only half the total observed value be utilized. It should also be noted that, as mentioned above, an increase of approximately 10% in available filtering surface area exists for double-density filter cassette 304. Even when this additional surface area is taken into account, an increase in flow rate of greater than 100% (i.e., a doubling of flow rate) still occurs.

It has been found that there is a preferred operational approach that may be used during administration of the relaxation cycle. As described above, the relaxation cycle consists of causing the vacuum applied by suction pump i 8 to be interrupted for a pause period and then reapplied for a resumption period. This pause period of no flow followed by a resumption period of normal forward flow may be repeated until sufficient internal dislodging of contaminant pockets has occurred within the filter pad.

A single iteration of the relaxation cycle is illustrated in FIG. 21. As shown, suction pump 18 is operating at speed X when inverter 246 cuts power to the pump to initiate the relaxation cycle. However, it takes a short period of time (represented as A) for the pump to wind down to a pump speed of true zero. Next, a pause period (represented as B) occurs. Inverter 246 then signals suction pump 18 to reinitiate normal forward flow. Just as with the pump wind down period, there is a ramping up period before suction pump 18 can again be operating at speed X.

Previously, inverter 246 had been programmed so that this ramping up period was of the same duration as the wind down period—namely, A. Operation under these parameters is illustrated by the dashed line of FIG. 21. However, it has been found that operating in such a manner may damage the fibers of the filter pad due to the abrupt nature of the reinitiation of normal forward flow following the pause period B. A second disadvantage is that contaminants may actually be compacted into the interior regions of the filter pad, thereby impeding filtering effectiveness when normal forward flow is resumed.

Accordingly, it is preferable that inverter 246 be programmed to lengthen the ramping up period to time A'. This is shown by the solid line of lesser slope in FIG. 21. To better understand this preferred operational approach, assume that a pause period of time B is employed. It was previously thought that perhaps 0.1 B was optimal for both the wind down period and the ramping up period. However, it has been found that increasing the ramping up period to 0.5 B or greater, thereby providing a more gradual reinitiation of normal forward flow, eliminates the above-described disadvantages. While this preferred operational approach was discovered during the design of double-density filtering system 300, it is equally beneficial when applied to filtering system 10.

CAVEATS

While preferred embodiments of the present invention have been illustrated and described, it should be understood that variations could be made therein without departing from the scope of the invention. For instance, the filtering systems of the present invention may be used in conjunction with filter pads of various composition to filter fluids other than contaminated cooking oil. As a further example, a second analog device may be employed as an alternative to the backflush cycle timer circuit built into the PLC. This would result in the backflush cycle being administered when monitored process parameters so indicate, rather than at discrete time intervals. Additionally, the two approaches taken to extend the loading life of the filter pad (backflush cycle and relaxation cycle) and the shear prevention measure all need not be employed. Beneficial filtering results would be obtained with any one individually, or with a combination of two.

Accordingly, it is to be understood that the invention is not to be limited to the specific embodiment illustrated and described. Rather, the true scope of the invention is to be determined by reference to the following claims.

The embodiments of the invention in which an exclusive property or privilege is claimed are defined as follows:

1. A double-density filtering system for filtering a contaminated fluid, the double-density filtering system comprising:
    a filter tank;
    a variable-speed first pump for delivering an inlet flow of contaminated fluid into said filter tank;
    a plurality of double-density filter cassettes removably supported within said filter tank, each of said double-density filter cassettes housing a pair of spaced filter pads to help minimize the volume of said filter tank;
    a variable-speed second pump in cooperative engagement with said plurality of removable double-density filter cassettes, said second pump providing a vacuum to said double-density filter cassettes to draw the contaminated fluid through said filter pads and further providing a return flow of filtered fluid; and
    a level control mechanism interactively coupled to said first pump capable to adjusting the flow rate of said first pump to maintain a substantially uniform level of fluid in said filter tank.

2. The double-density filter system of claim 1, wherein said filter pads have an entrance side, an exit side, and a peripheral seating cut-out formed therein, and wherein said double-density filter cassette comprises:
    a pair of sealing members, each having an inlet opening through which the contaminated fluid enters and having a peripheral configuration and dimension substantially matching that of said filter pads;
    a filter pad support member having a central chamber flanked by a pair of seating surfaces and inwardly disposed filter pad support screens against which said filter pads are positioned, said seating surfaces having a peripheral configuration and dimension substantially matching that of said filter pads to ensure that only said exit sides in said filter pads may rest against said seating surfaces, said filter pad support member further having an outlet aperture through which the filtered fluid exits after passing through said filter pads; and
    securing means for maintaining said sealing member and said filter pad support member in a closed operative position such that said sealing members compress said filter pads against said seating surfaces of said filter pad support member to create a substantially fluid-tight seal, thereby preventing contaminated fluid from exiting said outlet aperture of said filter pad support member without passing through said filter pads.

3. The double-density filtering system of claim 2, wherein the ratio of the volume of said central chamber to the surface area of said entrance side of said filter pad is at least 0.30.

4. The double-density filtering system of claim 3, wherein said ratio is between 0.05 and 1.00.

5. The double-density filtering system of claim 1, further comprising means for monitoring said inlet flow of contaminated fluid and periodically reversing flow through said filter pads upon the occurrence of a first filtering process condition.

6. The double-density filtering system of claim 1, further comprising means for monitoring said inlet flow of contaminated fluid and decreasing the speed of said second pump when said inlet flow of contaminated fluid falls below a preset percentage of its initial flow rate.

7. The double-density filtering system of claim 1, further comprising means for periodically interrupting flow through said filter pads upon the occurrence of a second filter process condition.

8. The double-density filtering system of claim 1, further comprising isolating valves for each of said double-density filter cassettes that allow said filter cassettes to be inserted into and extracted from said filter tank without requiring termination of the filtering process.

* * * * *

UNITED STATES PATENT AND TRADEMARK OFFICE
CERTIFICATE OF CORRECTION

PATENT NO. : 5,354,455                                    Page 1 of 2
DATED      : October 11, 1994
INVENTOR(S): S.A. Burklund et al.

It is certified that error appears in the above-indentified patent and that said Letters Patent is hereby corrected as shown below:

COLUMN         LINE

On the title page, item

| COLUMN | LINE | CORRECTION |
|---|---|---|
| [57] | Abstract | "cassettes(304)" should read --cassettes (304)-- |
| 2 | 47 | "oil ∝ s" should read --oil's-- |
| 4 | 7 | "half The" should read --half. The-- |
| 11 | 7 | "comer" should read --corner-- |
| 18 | 45 | "preformed." should read --performed.-- |
| 21 | 14 | "3 14" should read --314-- |
| 21 | 36 | "3 18" should read --318-- |
| 25 | 56 | "4 12" should read --412-- |
| 28 | 13 | "pump i 8" should read --pump 18-- |

UNITED STATES PATENT AND TRADEMARK OFFICE
CERTIFICATE OF CORRECTION

PATENT NO. : 5,354,455
DATED : October 11, 1994
INVENTOR(S) : S.A. Burklund et al.

It is certified that error appears in the above-indentified patent and that said Letters Patent is hereby corrected as shown below:

| COLUMN | LINE | |
|---|---|---|
| 29 (Claim 1, | 39 line 20) | "to" should read --of-- |
| 29 (Claim 2, | 42 line 1) | "filter" should read --filtering-- |
| 30 (Claim 2, | 9 line 16) | "in" should read --of-- |

Signed and Sealed this

Twenty-first Day of February, 1995

Attest:

BRUCE LEHMAN

Attesting Officer

Commissioner of Patents and Trademarks